US012584009B2

(12) United States Patent
Ozaki

(10) Patent No.: US 12,584,009 B2
(45) Date of Patent: Mar. 24, 2026

(54) RUBBER COMPOSITION FOR TRANSMISSION BELT AND TRANSMISSION BELT

(71) Applicant: Mitsuboshi Belting Ltd., Kobe (JP)

(72) Inventor: Toshiki Ozaki, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 0 days.

(21) Appl. No.: 18/722,137

(22) PCT Filed: Jan. 19, 2023

(86) PCT No.: PCT/JP2023/001495
§ 371 (c)(1),
(2) Date: Jun. 20, 2024

(87) PCT Pub. No.: WO2023/140318
PCT Pub. Date: Jul. 27, 2023

(65) Prior Publication Data
US 2025/0075064 A1 Mar. 6, 2025

(30) Foreign Application Priority Data

Jan. 20, 2022 (JP) ................................. 2022-007213
Dec. 28, 2022 (JP) ................................. 2022-212385

(51) Int. Cl.
C08L 23/16 (2006.01)
C08F 210/16 (2006.01)
(Continued)

(52) U.S. Cl.
CPC ............ C08L 23/16 (2013.01); C08F 210/16 (2013.01); C08K 3/04 (2013.01); C08K 3/346 (2013.01);
(Continued)

(58) Field of Classification Search
CPC ...... C08L 23/16; C08L 23/08; C08L 2205/16; C08L 2312/00; C08K 3/04; C08K 7/02;
(Continued)

(56) References Cited

U.S. PATENT DOCUMENTS 6,525,105 B1* 2/2003 Udagawa ................ C09C 1/482
423/449.2
9,206,277 B2* 12/2015 Tanaka .................... C08C 19/22
(Continued)

FOREIGN PATENT DOCUMENTS

CN 101583809 A 11/2009
JP 2002-081506 A 3/2002
(Continued)

OTHER PUBLICATIONS

Mar. 14, 2023—International Search Report—Intl App PCT/JP2023/001495.
(Continued)

*Primary Examiner* — Henry Y Liu
(74) *Attorney, Agent, or Firm* — Banner & Witcoff, Ltd.

(57) ABSTRACT

A rubber composition for a power-transmission belt includes: a polymer component including an ethylene-α-olefin elastomer; carbon black; and clay, in which the ethylene-α-olefin elastomer has a Mooney viscosity at 125° C. of 25 ML (1+4) 125° C. or less, the clay has a pH of 5.5 or higher, a total amount of the carbon black and the clay is 80 parts by mass to 180 parts by mass with respect to 100 parts by mass of the polymer component, and a mass ratio of the carbon black to the clay is clay/carbon black=0.2/1 to 1.2/1.

8 Claims, 4 Drawing Sheets

(51) Int. Cl.

| | |
|---|---|
| *C08K 3/04* | (2006.01) |
| *C08K 3/34* | (2006.01) |
| *F16G 5/04* | (2006.01) |
| *F16G 5/20* | (2006.01) |

(52) U.S. Cl.
CPC ................ *F16G 5/04* (2013.01); *F16G 5/20* (2013.01); *C08F 2810/20* (2013.01); *C08K 2201/014* (2013.01); *C08L 2205/16* (2013.01); *C08L 2312/00* (2013.01)

(58) Field of Classification Search
CPC ..... C08K 3/346; C08K 2201/014; F16G 1/28; F16G 5/04; F16G 5/20; F16G 5/06; F16G 1/08; F16G 5/08; C08F 2810/20; C08F 210/16
USPC ................................................. 474/205, 242
See application file for complete search history.

(56) References Cited

U.S. PATENT DOCUMENTS

| | | | | |
|---|---|---|---|---|
| 9,212,276 | B2 * | 12/2015 | Tanaka .................... | C08C 19/22 |
| 9,243,683 | B2 * | 1/2016 | Tomobuchi ............... | F16G 1/10 |
| 9,522,993 | B2 * | 12/2016 | Kobayashi ............. | C08L 11/00 |
| 9,550,840 | B2 * | 1/2017 | Nakamura ............... | C08K 3/36 |
| 10,131,726 | B2 * | 11/2018 | Ichino ...................... | C08K 3/34 |
| 10,919,997 | B2 * | 2/2021 | Endo .................... | C08F 210/18 |
| 11,078,352 | B2 * | 8/2021 | Ichino ........................ | C08J 3/24 |

| | | | | |
|---|---|---|---|---|
| 2002/0032091 | A1 | 3/2002 | Okuno et al. | |
| 2006/0280892 | A1 | 12/2006 | Davis et al. | |
| 2010/0240809 | A1 | 9/2010 | Yamada | |
| 2010/0323835 | A1 | 12/2010 | Furukawa et al. | |
| 2014/0206487 | A1 * | 7/2014 | Tomobuchi .............. | C08J 5/046 |
| | | | | 474/205 |
| 2015/0024892 | A1 | 1/2015 | Hineno et al. | |
| 2015/0368387 | A1 * | 12/2015 | Nosaka ................... | C08L 15/00 |
| | | | | 525/271 |
| 2019/0128372 | A1 * | 5/2019 | Ishiguro ................. | B32B 3/263 |
| 2019/0359810 | A1 * | 11/2019 | Xu ........................... | C08L 23/16 |
| 2021/0102052 | A1 * | 4/2021 | Dharmarajan ........... | F16G 1/06 |
| 2021/0139666 | A1 * | 5/2021 | Motoda .................... | C08L 9/00 |

FOREIGN PATENT DOCUMENTS

| | | |
|---|---|---|
| JP | 2006-064174 A | 3/2006 |
| JP | 2013-185678 A | 9/2013 |
| JP | 2017-106518 A | 6/2017 |
| WO | 2009-060748 A1 | 5/2009 |
| WO | 2013-133378 A1 | 9/2013 |
| WO | 2021-061578 A1 | 4/2021 |

OTHER PUBLICATIONS

Sep. 11, 2023—(TW) Office Acton—App No. 112102673.
Dec. 16, 2025—(EP) Search Report—App 23743311.5.
Dec. 24, 2025—(CA) Office Action—App 3,243,174.
Jan. 14, 2026—(KR) Request for the Submission of an Opinion—App 10-2024-7021941.

* cited by examiner

ORIENTATION DIRECTION OF SHORT FIBER

ORIENTATION DIRECTION OF SHORT FIBER

RUBBER COMPOSITION FOR TRANSMISSION BELT AND TRANSMISSION BELT

CROSS REFERENCE TO RELATED APPLICATIONS

This is a U.S. National Phase Application under 35 U.S.C. § 371 of International Application No. PCT/JP2023/001495, filed Jan. 19, 2023, which claims priority to Japanese Application Nos. 2022-007213, filed Jan. 20, 2022, and 2022-212385, filed Dec. 28, 2022, which were published Under PCT Article 21(2), the entire contents of which are incorporated herein by reference.

TECHNICAL FIELD

The present invention relates to a rubber composition used for a power-transmission belt and a power-transmission belt containing the rubber composition.

BACKGROUND ART

As a unit for transmitting power, a power-transmission belt is widely used in addition to a gear and a chain. A power-transmission belt formed in an annular shape is wound around a driving pulley connected to a driving shaft and a driven pulley connected to a driven shaft, and transmits power from the driving shaft to the driven shaft. Compared with a gear and a chain, the power-transmission belt has many advantages such as lightness in weight, high flexibility of layout, no need for supplying oil, and excellent quietness, and is used in many applications including automobiles and agricultural machines.

The power-transmission belt is roughly classified into a synchronous power-transmission belt and a frictional power-transmission belt. In the synchronous power-transmission belt, a toothed pulley having tooth grooves on an outer circumferential surface and a toothed belt having tooth portions on an inner circumferential surface are mechanically fitted to transmit power. Since power is transmitted by mechanical fitting, a driving pulley and a driven pulley can be synchronized with each other, and the synchronous power-transmission belt may be referred to as a synchronized power-transmission belt. On the other hand, the frictional power-transmission belt transmits power by a friction force between a pulley and a belt, and some slip is allowed between the pulley and the belt. Therefore, in the case where an excessive load occurs, there is a function of preventing damage to a device due to a temporary slip of the belt. As the frictional power-transmission belt, a flat belt, a V-belt, a V-ribbed belt, and the like are known. In this way, the synchronous power-transmission belt and the frictional power-transmission belt are distinguished as power-transmission belts having different properties, and an optimum belt is selected depending on applications.

Examples of the V-belt include a raw-edge type (raw-edge V-belt) serving as a rubber layer in which a frictional transmission surface is exposed, and a wrapped type (wrapped V-belt) in which a frictional transmission surface (V-shaped side surface) is covered with a cover fabric, and is selectively used according to applications depending on a difference in surface properties (friction coefficient between the rubber layer and the cover fabric) of the frictional transmission surface. Examples of the raw-edge type belt include a raw-edge V-belt in which cogs are not provided, a raw-edge cogged V-belt in which cogs are provided only on a lower surface (inner circumferential surface) of the belt to improve bendability, and a raw-edge cogged V-belt (raw-edge double cogged V-belt) in which cogs are provided on both a lower surface (inner circumferential surface) and an upper surface (outer circumferential surface) of the belt to improve bendability.

The raw-edge V-belt and the raw-edge cogged V-belt are mainly used for driving a general industrial machine and an agricultural machine, for driving accessories in an engine of an automobile, and the like. As another application, there is a raw-edge cogged V-belt referred to as a variable speed belt used for a belt-type continuously variable transmission of a motorcycle or the like.

As illustrated in FIGS. 1A and 1, a belt-type continuously variable transmission 30 is a device that continuously changes a gear ratio by winding a raw-edge cogged V-belt 1 around a driving pulley 31 and a driven pulley 32. The pulleys 31 and 32 respectively have fixed sheaves 31a and 32a which are fixed or restrained from movement in an axial direction, and movable sheaves 31b and 32b which are movable in the axial direction, and each of the pulleys 31 and 32 has a structure in which a width of a V-shaped groove of each of the pulleys 31 and 32 formed by the fixed sheaves 31a and 32a and the movable sheaves 31b and 32b can be continuously changed. Both end surfaces in a width direction of the raw-edge cogged V-belt 1 are formed as tapered surfaces each having an inclination corresponding to opposing surfaces of the V-shaped grooves of the pulleys 31 and 32, and are engaged at any positions in a pulley radial direction according to the changed width of the V-shaped grooves. For example, when a state illustrated in FIG. 1A is changed to a state illustrated in FIG. 1B by decreasing the width of the V-shaped groove of the driving pulley 31 and increasing the width of the V-shaped grooves of the driven pulley 32, the raw-edge cogged V-belt 1 moves toward an outer circumferential side in the pulley radial direction on a driving pulley 31 side and moves toward an inner circumferential side in the pulley radial direction on a driven pulley 32 side, and a radius of winding of the belt around the respective pulleys 31 and 32 is continuously changed, making it possible to continuously change the gear ratio. A variable speed belt used for such an application is designed specifically to endure not only winding and rotation running between two shafts of a driving pulley and a driven pulley but also severe movement in a high-load environment, such as movement in a pulley radial direction and a repeated bending action due to a continuous change in a radius of winding.

Particularly, in recent years, transmission power is increased with an increase in displacement of a motorcycle, and a cooling mechanism tends to be simplified for a purpose of lightness in weight. Therefore, the power-transmission belt is required to improve mechanical properties (for example, hardness and lateral pressure resistance) and heat resistance.

In order to satisfy such requirements, the frequency of using an ethylene-α-olefin elastomer such as an ethylene-propylene-diene terpolymer (EPDM) used as a polymer component constituting a rubber layer is increased. Since the ethylene-α-olefin elastomer has no double bond in a main chain, the ethylene-α-olefin elastomer has an excellent heat resistance, and has an advantage in that a large amount of a filling agent is easily blended and the mechanical properties of the power-transmission belt are easily improved. Viscosity and hardness can be adjusted by changing a proportion of an ethylene component to an α-olefin component, and physical properties of a rubber composition can also be adjusted according to applications.

On the other hand, the ethylene-α-olefin elastomer exhibits a property closer to that of a resin as compared with a chloroprene rubber or the like in the related art, and has a problem that rolling into a thin sheet shape is difficult due to brittleness and lack of stickiness. In order to resolve such a problem, Patent Literature 1 proposes a use of a mixture of an ethylene-α-olefin elastomer having a molecular weight, an ethylene content, and a Mooney viscosity in specific ranges, and describes that when the Mooney viscosity is high, a roll processability of an unvulcanized rubber composition is deteriorated. In Examples, carbon black, a nylon short fiber, and the like are blended in EPDM to evaluate the roll processability, and a V-ribbed belt and a toothed belt are produced to evaluate a durability.

Carbon black and a short fiber tend to improve physical properties of a rubber composition, and have a disadvantage such as deterioration in the roll processability (rolling property). Therefore, a mineral filling agent may be used in combination with carbon black or a short fiber. For example, Patent Literature 2 discloses a frictional power-transmission belt capable of achieving both of power transmission properties and sounding resistance in a wet state, in which a frictional transmission part is formed of a rubber composition containing an ethylene-α-olefin elastomer, a mineral filling agent, and a surfactant. In Patent Literature 2, as the mineral filling agent, a metal silicate (aluminum silicate, clay, or the like) is exemplified, and a pH of the mineral filling agent is preferably 7 or more in order not to inhibit a crosslinking reaction. Although not described in Patent Literature 2, EPDM (EPT2060M manufactured by Mitsui Chemical Co., Ltd.) used in Examples has a Mooney viscosity of 40 ML (1+4) 125° C. at 125° C.

CITATION LIST

Patent Literature

Patent Literature 1: JP2002-81506A
Patent Literature 2: JP2013-185678A

SUMMARY OF INVENTION

Technical Problem

The configurations described in the above patent literatures are considered to exhibit a certain effect on each problem, but cannot sufficiently resolve the problem in production of a belt. Particularly, in relation to a processability, a blending amount of a reinforcing agent tends to increase in order to improve physical properties of rubber, but when the blending amount of the reinforcing agent increases, rolling tends to be difficult, and improvement in a rolling property is required. There is a demand for shortening a crosslinking time for energy saving, but since blending in which crosslinking easily proceeds is also blending in which scorch (unfavorable premature rubber burning occurring during processing) is likely to occur, strict control of a scorch time is required, ensuring that the scorch time is neither too long nor too short. It is still required to prevent phenomenons of causing a durability of a power-transmission belt to deteriorate, such as peeling, abrasion, and cracking, to improve the durability of the power-transmission belt.

Therefore, an object of the present invention is to provide a rubber composition which is less likely to cause scorch, is easy to roll, and can improve mechanical properties and a durability of a power-transmission belt, and a power-transmission belt containing the rubber composition.

Solution to Problem

As a result of intensive studies to achieve the above object, the present inventor has found that when a polymer component containing an ethylene-α-olefin elastomer having a low Mooney viscosity, carbon black, and clay having a pH of 5.5 or higher are combined at a specific proportion, scorch is less likely to occur, rolling is easy, and mechanical properties and a durability can be improved when the rubber composition is used for a power-transmission belt, thereby completing the present invention.

That is, a rubber composition according to an aspect [1] of the present invention is a rubber composition for a power-transmission belt including: a polymer component containing an ethylene-α-olefin elastomer; carbon black; and clay, in which the ethylene-α-olefin elastomer has a Mooney viscosity at 125° C. of 25 ML (1+4) 125° C. or less,
the clay has a pH of 5.5 or higher,
a total amount of the carbon black and the clay is 80 parts by mass to 180 parts by mass with respect to 100 parts by mass of the polymer component, and
a mass ratio of the carbon black to the clay is clay/carbon black=0.2/1 to 1.2/1.

In an aspect [2] of the present invention, a rubber hardness Hs (type A) of a crosslinked product of the rubber composition according to the aspect [1] is 88 degrees to 96 degrees.

In an aspect [3] of the present invention, the rubber composition according to the aspect [1] or [2] further contains a short fiber, and in a crosslinked product of the rubber composition, an 8% bending stress in a short fiber orthogonal direction is 6 MPa to 8 MPa.

In an aspect [4] of the present invention, the rubber composition according to any one of the aspects [1] to [3] further contains a short fiber, and a crosslinked product of the rubber composition has an 8% bending stress in a short fiber parallel direction of 2 MPa to 3 MPa.

In an aspect [5] of the present invention, the short fiber according to the aspect [3] or [4] is free from an aramid short fiber.

In an aspect [6] of the present invention, the clay according to any one of the aspects [1] to [5] includes a calcined clay.

In an aspect [7] of the present invention, the carbon black according to any one of the aspects [1] to [6] includes a hard carbon black.

The present invention also includes, as an aspect [8], a power-transmission belt containing a crosslinked product of the rubber composition according to any one of the aspects [1] to [7].

In an aspect [9] of the present invention, the power-transmission belt according to the aspect [8] is a raw-edge cogged V-belt.

In an aspect [10] of the present invention, the raw-edge cogged V-belt according to the aspect [9] is a variable speed belt.

Advantageous Effects of Invention

In the present invention, a polymer component containing an ethylene-α-olefin elastomer having a low Mooney viscosity, carbon black, and clay having a pH of 5.5 or higher are combined at a specific proportion, and thus scorch is less likely to occur, rolling is easy, and mechanical properties and a durability can be improved when the rubber composition is used for a power-transmission belt.

BRIEF DESCRIPTION OF DRAWINGS

Each of FIGS. 1A and 1B is a schematic view for illustrating a transmission system of a belt-type continuously variable transmission.

DESCRIPTION OF EMBODIMENTS

[Rubber Composition]

Figure 1A:
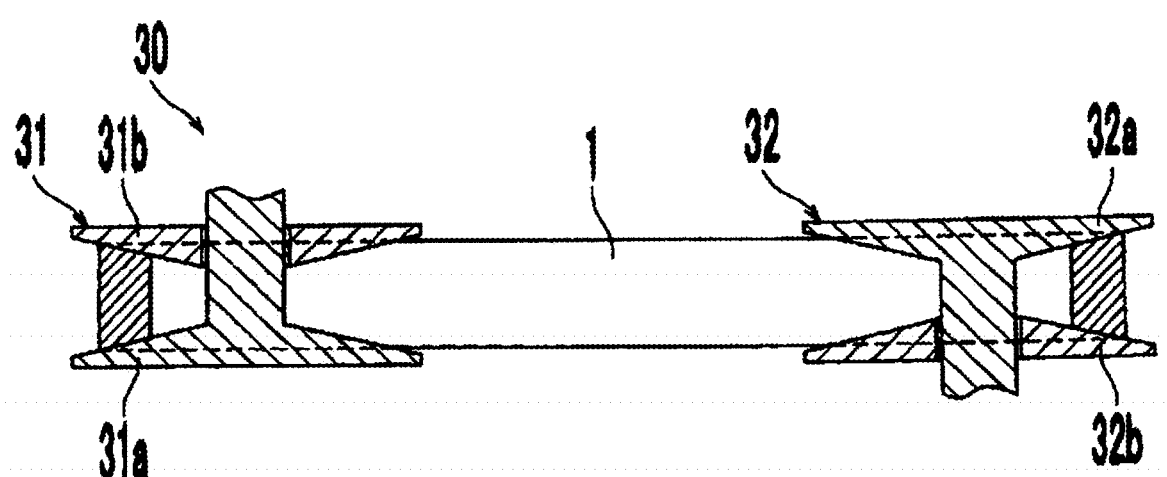
Figure 1B:
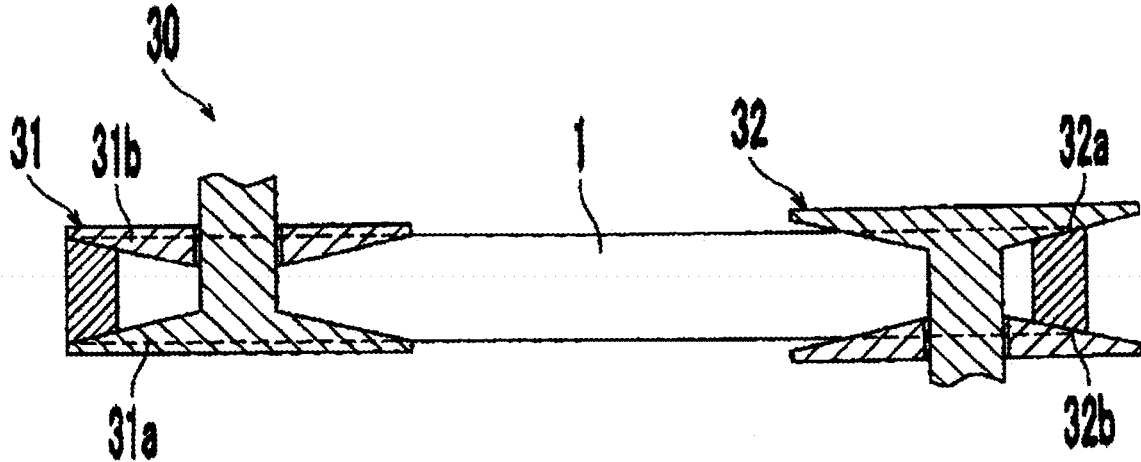

A rubber composition for a power-transmission belt of the present invention contains a polymer component containing an ethylene-α-olefin elastomer, carbon black, and clay.

(Polymer Component)

The polymer component contains an ethylene-α-olefin elastomer from the viewpoint of excellent heat resistance, cold resistance, and weather resistance.

The ethylene-α-olefin elastomer need only contain an ethylene unit and an α-olefin unit as structural units, and may further contain a diene unit. Therefore, the ethylene-α-olefin elastomer includes an ethylene-α-olefin copolymer rubber, an ethylene-α-olefin-diene terpolymer rubber, and the like.

Examples of an α-olefin for forming the α-olefin unit include linear α-$C_{3-12}$ olefins such as propylene, butene, pentene, methylpentene, hexene, and octene. Among these α-olefins, an α-$C_{3-4}$ olefin (particularly propylene) such as propylene is preferable.

As a diene monomer for forming the diene unit, a non-conjugated diene monomer is generally used. Examples of the non-conjugated diene monomer include dicyclopentadiene, methylene norbornene, ethylidene norbornene, 1,4-hexadiene, and cyclooctadiene. Among these diene monomers, ethylidene norbornene and 1,4-hexadiene (particularly, ethylidene norbornene) are preferable.

Examples of the representative ethylene-α-olefin elastomer include an ethylene-α-olefin rubber [such as ethylene-propylene rubber (EPM), ethylene-butene rubber (EBM), and ethylene-octene rubber (EOM)] and an ethylene-α-olefin-diene rubber [ethylene-propylene-diene terpolymer (EPDM)].

These ethylene-α-olefin elastomers may be used alone or in combination of two or more kinds thereof. Among these, from the viewpoint of excellent heat resistance, cold resistance, and weather resistance, an ethylene-α-olefin-diene terpolymer rubber such as an ethylene-α-$C_{3-4}$ olefin-diene terpolymer rubber is preferable, and EPDM is particularly preferable. Therefore, a proportion of EPDM may be 50 mass % or more, preferably 80 mass % or more, and furthermore preferably 90 mass % or more (particularly 95 mass %) with respect to the entire ethylene-α-olefin elastomer, and may be 100 mass % (only EPDM).

In the ethylene-α-olefin elastomer, a proportion (mass ratio) of ethylene to α-olefin is former/latter=40/60 to 90/10, preferably 45/55 to 85/15 (for example, 50/50 to 80/20), and furthermore preferably 52/48 to 70/30. Particularly, in the ethylene-propylene-diene terpolymer, the proportion (mass ratio) of ethylene to propylene may be former/latter=35/65 to 90/10, preferably 40/60 to 80/20, furthermore preferably 45/55 to 70/30, more preferably 50/50 to 70/30 (for example, 50/50 to 60/40), and most preferably 55/45 to 70/30 (particularly 55/45 to 65/35).

A diene content of the ethylene-α-olefin elastomer (particularly an ethylene-α-olefin-diene terpolymer rubber such as EPDM) may be 15 mass % or less (for example, 0.1 mass % to 15 mass %), preferably 10 mass % or less (for example, 0.3 mass % to 10 mass %), furthermore preferably 7 mass % or less (for example, 0.5 mass % to 7 mass %), and more preferably 5 mass % or less (for example, 1 mass % to 5 mass %). If the diene content is too large, a high heat resistance may not be ensured.

In the present application, the diene content refers to a mass proportion of a diene monomer unit in all units constituting the ethylene-α-olefin elastomer, can be measured by a commonly used method, and may be a proportion based on the monomer.

An iodine value of the ethylene-α-olefin elastomer containing the diene monomer is, for example, 3 to 40, preferably 5 to 30, and furthermore preferably 10 to 20. If the iodine value is too small, crosslinking of the rubber composition becomes insufficient, and wear and adhesion tend to occur. Conversely, if the iodine value is too large, scorch of the rubber composition becomes shorter and becomes difficult to handle, and heat resistance tends to deteriorate.

The rubber composition of the present invention has properties in which an uncrosslinked ethylene-α-olefin elastomer has a low Mooney viscosity. The Mooney viscosity is used as an index representing fluidity (ease of processing) of rubber by filling a rubber composition so as to be in contact with a rotor provided with a groove on a surface in a cavity, and measuring a torque necessary for rotating the rotor.

The Mooney viscosity [ML (1+4) 125° C.] of the uncrosslinked ethylene-α-olefin elastomer is 25 or less (particularly 20 or less), for example, 5 to 25, preferably 10 to 23, furthermore preferably 12 to 22, more preferably 15 to 21, and most preferably 18 to 20. If the Mooney viscosity is too high, the rolling property deteriorates.

In the present application, the Mooney viscosity can be measured by a method in accordance with a Mooney viscosity test of JIS K 6300-1 (2013), and test conditions include a test temperature of 125° C., preheating of 1 minute, and a rotor operation time of 4 minutes using an L-shaped rotor.

A proportion of the ethylene-α-olefin elastomer in the polymer component may be 50 mass % or more, preferably 80 mass % or more, furthermore preferably 90 mass % or more, and most preferably 100 mass % (only ethylene-α-olefin elastomer). If the proportion of the ethylene-α-olefin elastomer in the polymer component is too small, the heat resistance and the cold resistance may deteriorate.

As long as effects of the present invention are not impaired, the polymer component may contain, in addition to the ethylene-α-olefin elastomer, other rubber components such as a diene rubber [a natural rubber, an isoprene rubber, a butadiene rubber, a chloroprene rubber, a styrene-butadiene rubber (SBR), a vinylpyridine-styrene-butadiene copolymer rubber, an acrylonitrile-butadiene rubber (nitrile rubber), a hydrogenated product of the diene rubber such as a hydrogenated nitrile rubber (containing a mixed polymer of a hydrogenated nitrile rubber and an unsaturated carboxylic acid metal salt), and the like], an olefin rubber (a polyoctenylene rubber, an ethylene-vinyl acetate copolymer rubber, a chlorosulfonated polyethylene rubber, an alkylated chlorosulfonated polyethylene rubber, and the like), an epichlorohydrin rubber, an acrylic rubber, a silicone rubber, a urethane rubber, a fluorine rubber, and the like.

A proportion of the above other rubber components may be 50 mass % or less, preferably 20 mass % or less, and more preferably 10 mass % or less in the polymer component.

(Carbon Black)

In general, the carbon black is classified into several grades depending on differences in a primary particle diameter, an iodine adsorption amount, a BET specific surface area, and the like. The carbon black having a small primary particle diameter has a high reinforcing effect on rubber, whereas the carbon black having a large primary particle diameter has a low reinforcing effect on rubber.

As for the classification of the carbon black, in ASTM, the carbon black is classified into N0 to N9 based on the iodine adsorption amount, and classifications (SAF, HAF, GPF, and the like) in the related art based on a performance of a blended rubber product and the like are also used. N110 (SAF), N220 (ISAF), N330 (HAF), and the like having small primary particle diameters are referred to as hard carbon, and N550 (FEF), N660 (GPF), N762 (SRF), and the like having large primary particle diameters are also referred to as soft carbon. There is a tight relationship between the iodine adsorption amount and the primary particle diameter, and the smaller the primary particle diameter, the larger the iodine adsorption amount. SEAST (registered trademark) series manufactured by Tokai Carbon Co., Ltd. are taken as examples, and the classification, the iodine adsorption amount, and an average primary particle diameter are summarized as relationships shown in Table 1.

TABLE 1

| | ASTM classification | Classification in related art | Brand | Iodine adsorption amount (g/kg) | Average primary particle diameter (nm) |
|---|---|---|---|---|---|
| Hard carbon | N110 | SAF | SEAST 9 | 139 | 19 |
| | N220 | ISAF | SEAST 6 | 121 | 22 |
| | N330 | HAF | SEAST 3 | 80 | 28 |
| Soft carbon | N550 | FEF | SEAST SO | 44 | 43 |
| | N660 | GPF | SEAST V | 26 | 62 |
| | N762 | SRF | SEAST S | 26 | 66 |

In the present invention, the carbon black contained in the rubber composition is not classified by raw materials, and the carbon black having a primary particle diameter of less than 40 nm is referred to as the hard carbon, and the carbon black having a primary particle diameter of 40 nm or more is referred to as the soft carbon.

The primary particle diameter of the hard carbon may be less than 40 nm (for example, 15 nm to 35 nm), and a maximum primary particle diameter may be, for example, 38 nm or less, preferably 35 nm or less, and furthermore preferably 30 nm or less. If the maximum primary particle diameter of the hard carbon is too large, the physical properties of the rubber may deteriorate. A minimum primary particle diameter may be, for example, 5 nm or more, preferably 8 nm or more, and furthermore preferably 10 nm or more. If the minimum primary particle diameter of the hard carbon is too small, preparation of the hard carbon itself may become difficult.

An average primary particle diameter of the hard carbon is, for example, 10 nm to 35 nm, preferably 15 nm to 33 nm, and furthermore preferably 20 nm to 32 nm (particularly 25 nm to 30 nm). If the average primary particle diameter of the hard carbon is too small, preparation of the hard carbon itself may become difficult. Conversely, if the average primary particle diameter is too large, the physical properties of the rubber may deteriorate.

In the present application, the primary particle diameter, the maximum primary particle diameter, and the average primary particle diameter of the carbon black can be measured on a number basis by using, for example, a transmission electron microscope.

The BET specific surface area of the hard carbon is, for example, 60 $m^2$/g to 160 $m^2$/g, preferably 65 $m^2$/g to 150 $m^2$/g, furthermore preferably 70 $m^2$/g to 140 $m^2$/g, more preferably 75 $m^2$/g to 130 $m^2$/g, and most preferably 75 $m^2$/g to 100 $m^2$/g. If the BET specific surface area is too small, the rubber composition may be difficult to stretch. Conversely, if the BET specific surface area is too large, the hardness of the rubber composition may become too high.

In the present application, the BET specific surface area means a specific surface area measured by a BET method using a nitrogen gas.

The iodine adsorption amount of the hard carbon may be 60 g/kg or more, for example, 60 g/kg to 150 g/kg, preferably 65 g/kg to 130 g/kg, furthermore preferably 70 g/kg to 100 g/kg, and most preferably 75 g/kg to 90 g/kg. If the iodine adsorption amount is too small, the physical properties of the rubber may deteriorate. Conversely, if the iodine adsorption amount is too large, preparation of the hard carbon itself may become difficult.

In the present application, the iodine adsorption amount of the carbon black can be measured in accordance with a standard test method of ASTM D1510-17.

The primary particle diameter of the soft carbon may be 40 nm or more (for example, 40 nm to 100 nm), and the maximum primary particle diameter may be, for example, 300 nm or less, preferably 200 nm or less, and furthermore preferably 100 nm or less. If the maximum primary particle diameter of the soft carbon is too large, a reinforcing property of the carbon black may deteriorate, and the physical properties of the rubber may deteriorate.

The average primary particle diameter of the soft carbon is, for example, 45 nm to 100 nm, preferably 50 nm to 90 nm (for example, 55 nm to 80 nm), and furthermore preferably 60 nm to 70 nm (particularly 63 nm to 68 nm).

The BET specific surface area of the soft carbon measured by the BET method is, for example, 10 $m^2$/g to 60 $m^2$/g (for example, 25 $m^2$/g to 60 $m^2$/g), preferably 15 $m^2$/g to 55 $m^2$/g, furthermore preferably 20 $m^2$/g to 50 $m^2$/g, more preferably 22 $m^2$/g to 40 $m^2$/g, and most preferably 23 $m^2$/g to 30 $m^2$/g.

The iodine adsorption amount of the soft carbon may be less than 60 g/kg, for example, 10 g/kg or more and less than 60 g/kg, preferably 15 g/kg to 50 g/kg, furthermore preferably 18 g/kg to 40 g/kg, and most preferably 20 g/kg to 30 g/kg.

In the rubber composition of the present invention, the carbon black preferably contains the hard carbon having a primary particle diameter of less than 40 nm. When the hard carbon is contained, the physical properties of the rubber are improved, and mechanical properties and a durability of the belt can be improved. When a large amount of the hard carbon is blended, a processability (rolling property) is likely to deteriorate, but in the rubber composition of the present invention, since the clay is contained in a certain proportion or more, the deterioration in the processability can be prevented, and thus it is preferable to contain the hard carbon having a higher reinforcing property. Furthermore, since the hard carbon can improve the physical properties of the rubber with a smaller amount as compared with the soft carbon, economical efficiency of the hard carbon is high.

A proportion of the hard carbon in the carbon black may be 50 mass % or more, preferably 80 mass % or more, furthermore preferably 90 mass % or more, and most preferably 100 mass % (only hard carbon). If the proportion of the hard carbon in the carbon black is too small, the physical properties of the rubber may deteriorate.

A total proportion of the carbon black is, for example, 50 parts by mass to 150 parts by mass, preferably 55 parts by mass to 120 parts by mass, furthermore preferably 60 parts by mass to 100 parts by mass, more preferably 65 parts by mass to 90 parts by mass, and most preferably 70 parts by mass to 80 parts by mass with respect to 100 parts by mass of the polymer component. If the total proportion of the carbon black is too small, the rubber composition may be too soft and the durability may deteriorate. Conversely, if the total proportion is too large, the rubber composition may be too hard and the durability and the rolling property may deteriorate.

(Clay)

In the rubber composition of the present invention, the carbon black and the specific clay are combined as a filling agent (filler).

The ethylene-α-olefin elastomer such as EPDM is excellent in the heat resistance, but has a problem that rolling into a sheet shape is difficult due to brittleness and lack of stickiness. Particularly, in a power-transmission belt, it is necessary to blend the carbon black and a short fiber in order to improve the hardness and the wear resistance, but rolling becomes more difficult as a blending amount of the carbon black and the short fiber is increased. In order to facilitate rolling, it is conceivable to use an ethylene-α-olefin elastomer having a low Mooney viscosity or to reduce the blending amount of the carbon black and the short fiber, either method is unfavorable because either method tends to reduce the physical properties of the rubber composition. That is, the rolling property and the mechanical properties of the rubber composition are difficult to be compatible with each other in a trade-off relationship.

On the other hand, a basic design concept of the rubber composition of the present invention is to improve physical properties of the rubber composition by blending a large amount of the carbon black and the clay while facilitating rolling by using an ethylene-α-olefin elastomer having a low Mooney viscosity. When the carbon black is blended in a large amount, rolling becomes difficult, and thus the difficult problem can be resolved by using clay showing a milder reinforcing property than the carbon black and blending the carbon black and the clay at a specific ratio in combination.

A pH of the clay is 5.5 or more (particularly 6 or more), for example, 6 to 10 (for example, 6 to 7.5), preferably 6 to 8 (for example, 6.2 to 7.2), furthermore preferably 6 to 7.3 (for example, 6 to 7), more preferably 6 to 6.7, and most preferably 6 to 6.5. When the pH of the clay is low, scorch is likely to occur, and the rolling property also deteriorates. From the description in paragraph [0026] of Patent Literature 2, it is interpreted that the crosslinking reaction may be inhibited if the pH of the blending agent in the rubber composition is low. On the contrary, in Examples of the present application, scorch, which is a state in which the crosslinking reaction is excessively promoted, occurs if the pH of the clay is low. The relationship between the pH of the clay and a progress of the crosslinking reaction is opposite to that disclosed in Patent Literature 2, and is an unexpected result.

In the present application, the pH of the clay can be measured by a commonly used method, for example, a method in accordance with JIS K 5101-17-2(2004), and more specifically, can be measured by a method described in Examples to be described later.

The clay is not particularly limited as long as the clay contains aluminum silicate, and is preferably a kaolin clay, an agalmatolite clay, or a calcined clay.

The kaolin clay is hydrous aluminum silicate ($Al_2O_3$ $2SiO_2$ $2H_2O$) obtained by pulverizing kaolinite which is natural clay mineral. The kaolin clay forms plate-like particles having a two-layer structure of silica and alumina as a repeating unit. Furthermore, many acidic active groups (OH groups) are present on the surface of the particle and many thereof exhibit acidity.

The agalmatolite clay is also referred to as catalpo, and is hydrous aluminum silicate ($Al_2O_3$-$4SiO_2$—$H_2O$) obtained by pulverizing pyrophyllite. The agalmatolite clay forms plate-like particles having a three-layer structure of silica/alumina/silica as a repeating unit. The number of acidic active groups on the surface of the particle in the agalmatolite clay is less than that of kaolin clay, and many thereof exhibit slight acidity.

The calcined clay is anhydrous aluminum silicate ($Al_2O_3$-$2SiO_2$) obtained by heating the kaolin clay at about 400° C. to 1000° C. to remove structural water. It is considered that the calcined clay loses the structural water to lose a crystal structure, and the acidic active groups are also reduced.

The average primary particle diameter of the clay is, for example, about 0.1 m to 20 m, preferably about 1 m to 10 m, and furthermore preferably about 1.5 m to 5 m. The smaller the clay particles are, the higher the reinforcing property tends to be. The clay having a high reinforcing property may be referred to as the hard clay, and the clay having a low reinforcing property may be referred to as the soft clay. Surface-modified clay obtained by performing surface modification using a surface active group also exists. The clay may be distinguished as wet (wet clay, wet kaolin) or dry (dry clay, dry kaolin) depending on the method of purification and classification.

In the present application, the average primary particle diameter of the clay can be measured using, for example, a laser diffraction method.

Examples of the shape of the clay include a plate shape, a particle shape, a rod shape, and an irregular shape. Among them, a plate shape (flake shape) is preferable.

The above kinds of clay may be used alone or in combination of two or more thereof. Among them, the agalmatolite clay and the calcined clay are preferable from the viewpoint that the rolling property can be improved by preventing the scorch, and the calcined clay is particularly preferable from the viewpoint that the mechanical properties of the power-transmission belt can be improved. In the calcined clay, an amount of the acidic active group on the surface of the particle is reduced by a heat treatment, and an interaction with the rubber component or the like in the rubber composition is reduced, and thus it can be estimated that the scorch is prevented and the rolling property is improved.

The proportion of the clay is, for example, 5 parts by mass to 100 parts by mass, preferably 10 parts by mass to 80 parts by mass, furthermore preferably 20 parts by mass to 60 parts by mass, more preferably 30 parts by mass to 50 parts by mass, and most preferably 35 parts by mass to 45 parts by mass with respect to 100 parts by mass of the polymer component. If the proportion of the clay is too small, the rolling property may deteriorate. Conversely, if the proportion is too large, the mechanical properties and the wear resistance of the power-transmission belt may deteriorate.

In the rubber composition of the present invention, a total amount of the carbon black and the clay is 80 parts by mass to 180 parts by mass, preferably 90 parts by mass to 150 parts by mass, furthermore preferably 100 parts by mass to 130 parts by mass, and more preferably 110 parts by mass to 120 parts by mass with respect to 100 parts by mass of the polymer component. If the total amount is small, the mechanical properties, the wear resistance, and peeling resistance of the power-transmission belt deteriorate. Conversely, if the total amount is large, the rolling property deteriorates and crack resistance of the power-transmission belt deteriorates.

A mass ratio of the clay to the carbon black is clay/carbon black=0.2/1 to 1.2/1 (particularly 0.25/1 to 1/1), preferably 0.3/1 to 0.9/1, furthermore preferably 0.4/1 to 0.8/1, more preferably 0.45/1 to 0.7/1, and most preferably 0.5/1 to 0.6/1. If the mass ratio of the clay is small, the rolling property deteriorates. Conversely, if the mass ratio is large, the mechanical properties and the wear resistance of the power-transmission belt deteriorate.

(Short Fiber)

The rubber composition of the present invention may further contain the short fiber. Examples of the short fiber include a synthetic fiber such as a polyolefin fiber (a polyethylene fiber, a polypropylene fiber, and the like), a polyamide fiber (a polyamide 6 fiber, a polyamide 66 fiber, a polyamide 46 fiber, an aramid fiber, and the like), a polyalkylene arylate fiber [a poly $C_{2-4}$ alkylene $C_{6-14}$ arylate fiber such as a polyethylene terephthalate (PET) fiber and a polyethylene naphthalate (PEN) fiber, and the like], a vinylon fiber, a polyvinyl alcohol fiber, and a poly(p-phenylene benzobisoxazole) (PBO) fiber; a natural fiber such as cotton, hemp, and wool; and an inorganic fiber such as a carbon fiber. These short fibers may be used alone or in combination of two or more thereof.

When the rubber composition of the present invention contains a relatively large amount of the carbon black and the clay, the physical properties of the rubber and the durability of the belt can be improved, and thus there is no need to use a highly rigid short fiber. Even when an inexpensive short fiber such as cotton, PET, and aliphatic polyamide (nylon) is used, the durability of the belt can be improved, and economical efficiency can be improved.

Therefore, the rubber composition of the present invention is preferably substantially free from an aramid fiber widely used as the highly rigid short fiber, and is particularly preferably free from an aramid fiber.

As the short fiber, among the above short fibers, a polyalkylene arylate fiber such as a PET fiber, a nylon fiber such as a polyamide 6 fiber, and a cellulose fiber such as cotton are preferable, a combination of the polyalkylene arylate fiber and/or the nylon fiber and the cellulose fiber is more preferable, and a combination of the polyalkylene arylate fiber and the cellulose fiber is most preferable.

When the polyalkylene arylate fiber and/or the nylon fiber are combined with the cellulose fiber, the mass ratio of the two fibers is former/latter=99/1 to 10/90, preferably 90/10 to 30/70, furthermore preferably 80/20 to 50/50, and more preferably 70/30 to 60/40.

The average fiber diameter of the short fiber is, for example, 1 μm to 1000 μm, preferably 3 μm to 100 μm, furthermore preferably 5 μm to 50 μm, and more preferably 10 μm to 30 μm. If the average fiber diameter is too large, mechanical properties of a cured product of the rubber composition may deteriorate.

The average fiber length of the short fiber is, for example, 1 mm to 20 mm, preferably 1.5 mm to 10 mm, furthermore preferably 2 mm to 7 mm, and more preferably 2.5 mm to 6 mm. If the average length of the short fiber is too short, the mechanical properties (for example, modulus) in a grain direction of the power-transmission belt may not be sufficiently enhanced. Conversely, if the length is too long, dispersibility of the short fiber in the rubber composition may deteriorate.

From the viewpoint of dispersibility and adhesiveness of the short fiber in the rubber composition, at least the short fiber is preferably subjected to an adhesion treatment (or surface treatment). It is unnecessary for all the short fibers to be subjected to the adhesion treatment, and the short fiber subjected to the adhesion treatment and the short fiber not subjected to the adhesion treatment (untreated short fibers) may be mixed or used in combination.

In the adhesion treatment of the short fiber, various adhesion treatments can be performed with, for example, a treatment liquid containing an initial condensate (such as a prepolymer of a novolac or resol type phenol resin) of phenols and formalin, a treatment liquid containing a rubber component (or a latex), a treatment liquid containing the initial condensate and the rubber component (latex), a treatment liquid containing a reactive compound (adhesive compound) such as a silane coupling agent, an epoxy compound (such as an epoxy resin), and an isocyanate compound. In a preferred adhesion treatment, the short fiber is treated with the treatment liquid containing the initial condensate and the rubber component (latex), particularly at least a resorcin-formalin-latex (RFL) liquid. Such treatment liquids may be used in combination, and for example, the short fiber may be pretreated with a commonly used adhesive component, for example, a reactive compound (adhesive compound) such as an epoxy compound (epoxy resin or the like) or an isocyanate compound, and then treated with an RFL liquid.

A proportion of the short fiber is, for example, 5 parts by mass to 100 parts by mass, preferably 10 parts by mass to 50 parts by mass, furthermore preferably 20 parts by mass to 40 parts by mass, and more preferably 25 parts by mass to 35 parts by mass with respect to 100 parts by mass of the polymer component. If the proportion of the short fiber is too small, the mechanical properties of the cured product of the rubber composition may deteriorate. Conversely, if the proportion is too large, uniform dispersion may be difficult.

(Crosslinking Agent)

The rubber composition may further contain a crosslinking agent. The crosslinking agent (or vulcanizing agent) may be a sulfur crosslinking agent and/or an organic peroxide.

Examples of the sulfur crosslinking agent include a powdered sulfur, a precipitated sulfur, a colloidal sulfur, an insoluble sulfur, a highly dispersible sulfur, and a sulfur chloride (sulfur monochloride, sulfur dichloride, and the like). These sulfur crosslinking agents may be used alone or in combination of two or more thereof. The sulfur crosslinking agent is preferably a powdered sulfur, a precipitated sulfur, a colloidal sulfur, an insoluble sulfur, a highly dispersible sulfur, and most preferably a powdered sulfur.

Examples of the organic peroxide include organic peroxides generally used for crosslinking of rubber and resin, such as diacyl peroxide, peroxy ester, and dialkyl peroxide (for example, dicumyl peroxide, t-butyl cumyl peroxide, 1,1-di-butylperoxy-3,3,5-trimethylcyclohexane, 2,5-dimethyl-2,5-di(t-butylperoxy)-hexane, 1,3-bis(t-butylperoxy-isopropyl) benzene, and di-t-butyl peroxide). These organic peroxides may be used alone or in combination of two or more thereof. Furthermore, the organic peroxide is preferably a peroxide having a decomposition temperature of about 150° C. to 250° C. (for example, 175° C. to 225° C.) at which a half-life of 1 minute is obtained by thermal decomposition.

Among them, the sulfur crosslinking agent is preferable from the viewpoint of being capable of improving the wear resistance of the belt.

A total proportion of the crosslinking agent is, for example, 1 part by mass to 10 parts by mass, preferably 1.5 parts by mass to 8 parts by mass, furthermore preferably 2 parts by mass to 6 parts by mass, and more preferably 2 parts by mass to 5 parts by mass with respect to 100 parts by mass of the polymer component. When the crosslinking agent is the sulfur crosslinking agent, the proportion of the crosslinking agent may be, for example, 0.5 parts by mass to 5 parts by mass, preferably 1 part by mass to 3 parts by mass, and furthermore preferably 1.5 parts by mass to 2.5 parts by mass with respect to 100 parts by mass of the polymer component. If the proportion of the crosslinking agent is too small, lateral pressure resistance of the power-transmission belt may deteriorate, and if the proportion is too large, scorch resistance, the rolling property, and the crack resistance may deteriorate.

(Crosslinking Accelerator)

The rubber composition may further contain a crosslinking accelerator in addition to the crosslinking agent (particularly a sulfur crosslinking accelerator).

Examples of the crosslinking accelerator include a thiuram accelerator [for example, tetramethylthiuram monosulfide (TMTM), tetramethylthiuram disulfide (TMTD), tetraethylthiuram disulfide (TETD), tetrabutylthiuram disulfide (TBTD), dipentamethylenethiuram tetrasulfide (DPTT), and N,N'-dimethyl-N,N'-diphenylthiuram disulfide], a sulfenamide accelerator [for example, N-cyclohexyl-2-benzothiazylsulfenamide (CBS), N,N'-dicyclohexyl-2-benzothiazylsulfenamide, and N-t-butyl-2-benzothiazylsulfenamide (TBBS)], a thiomorpholine accelerator [for example, 4,4'-dithiodimorpholine (DTDM) and 2-(4'-morpholinodithio) benzothiazole)], a thiazole accelerator [for example, 2-mercaptobenzothiazole (MBT), zinc salt of MBT, 2-mercaptobenzothiazole dibenzothiazyl disulfide (MBTS), 2-mercaptothiazoline, dibenzothiazyl disulfide, and 2-(4'-morpholinodithio)benzothiazole], a urea or thiourea accelerator [for example, ethylenethiourea, trimethylthiourea (TMU), and diethylthiourea (EDE)], a guanidine accelerator (diphenylguanidine, di-o-tolylguanidine, and the like), a dithiocarbamate accelerator [for example, sodium dimethyldithiocarbamate, zinc diethyldithiocarbamate (EZ), and zinc dibutyldithiocarbamate (BZ)], and an xanthogenate accelerator (zinc isopropylxanthate and the like) and the like. These crosslinking accelerators may be used alone or in combination of two or more thereof. Among these crosslinking accelerators, TMTD, DPTT, CBS, MBTS, and the like are widely used.

A proportion of the crosslinking accelerator is, for example, 0.2 parts by mass to 10 parts by mass, preferably 0.5 parts by mass to 7 parts by mass, furthermore preferably 1 part by mass to 5 parts by mass, more preferably 1.5 parts by mass to 4 parts by mass, and most preferably 2 parts by mass to 3 parts by mass with respect to 100 parts by mass of the polymer component. If the proportion of the crosslinking accelerator is too small, the lateral pressure resistance of the power-transmission belt may deteriorate, and if the proportion is too large, the scorch resistance, the rolling property, and the crack resistance may deteriorate.

(Co-Crosslinking Agent)

The rubber composition may further contain a co-crosslinking agent. Examples of the co-crosslinking agent (crosslinking aid or co-vulcanizing agent co-agent) include known crosslinking aids, for example, polyfunctional (iso)cyanurate [for example, triallyl isocyanurate (TAIC) and triallyl cyanurate (TAC)], polydiene (for example, 1,2-polybutadiene), a metal salt of an unsaturated carboxylic acid [for example, a polyvalent metal salt of a (meth)acrylic acid such as zinc (meth)acrylate and magnesium (meth)acrylate], oximes (for example, quinone dioxime), guanidines (for example, diphenyl guanidine), polyfunctional (meth)acrylate [for example, alkanediol di(meth)acrylate such as ethylene glycol di(meth)acrylate and butanediol di(meth)acrylate, and alkane polyol poly(meth)acrylate such as trimethylolpropane tri(meth)acrylate and pentaerythritol tetra(meth)acrylate], and bismaleimides [for example, an alkylene bismaleimide such as N,N'-1,2-ethylene dimaleimide, N,N'-hexamethylene bismaleimide, and 1,6'-bismaleimido-(2,2,4-trimethyl)cyclohexane; N,N'-m-phenylene dimaleimide (MPBM), 4-methyl-1,3-phenylene dimaleimide, 4,4'-diphenylmethane dimaleimide, 2,2-bis[arene bismaleimide such as 4-(4-maleimidophenoxy)phenyl]propane, 4,4'-diphenyl ether dimaleimide, 4,4'-diphenylsulfone dimaleimide, and 1,3-bis(3-maleimidophenoxy)benzene].

These co-crosslinking agents may be used alone or in combination of two or more thereof. Among them, bismaleimides such as MPBM are preferable from the viewpoint of being capable of improving the lateral pressure resistance and the wear resistance.

A proportion of the co-crosslinking agent is, for example, 0.1 parts by mass to 30 parts by mass, preferably 0.2 parts by mass to 20 parts by mass, furthermore preferably 0.3 parts by mass to 10 parts by mass, more preferably 0.5 parts by mass to 5 parts by mass, and most preferably 1 to 3 parts by mass with respect to 100 parts by mass of the polymer component. When the crosslinking agent is a sulfur crosslinking agent, the proportion of the co-crosslinking agent may be, for example, 0.1 parts by mass to 3 parts by mass, preferably 0.3 parts by mass to 2 parts by mass, and furthermore preferably 0.5 parts by mass to 1.5 parts by mass with respect to 100 parts by mass of the polymer component. If the proportion of the co-crosslinking agent is too small, the lateral pressure resistance may deteriorate, and if the proportion is too large, the crack resistance may deteriorate.

(Filler)

The rubber composition may further contain a filler (other inorganic filling agents) other than the carbon black and the clay. Examples of the filler include a carbonaceous material (graphite and the like) other than the carbon black, a metal compound or synthetic ceramics (a metal oxide such as magnesium oxide, calcium oxide, barium oxide, iron oxide, copper oxide, zinc oxide, titanium oxide, and aluminum oxide; metal silicate such as calcium silicate; metal carbide such as silicon carbide and tungsten carbide; metal nitride such as titanium nitride, aluminum nitride, and boron nitride; metal carbonate such as magnesium carbonate and calcium carbonate; metal sulfate such as calcium sulfate and barium sulfate; and the like), and a mineral material other than the clay (zeolite, diatomaceous earth, calcined diatomaceous earth, activated clay, alumina, silica, talc, mica, sericite, bentonite, montmorillonite, smectite, and the like). The metal oxide such as zinc oxide may act as a crosslinking agent, or a crosslinking accelerator or a co-crosslinking agent. These fillers may be used alone or in combination of two or more thereof.

Among these fillers, a metal oxide such as magnesium oxide or zinc oxide is preferable, and zinc oxide is particularly preferable.

A proportion of the filler is, for example, 1 part by mass to 30 parts by mass, preferably 2 parts by mass to 20 parts by mass, furthermore preferably 3 parts by mass to 10 parts by mass, and more preferably 4 parts by mass to 8 parts by mass with respect to 100 parts by mass of the polymer component.

(Other Components)

The rubber composition may further contain other components. Examples of the other components include a softening agent or a plasticizer (oils such as a paraffin oil and a naphthenic oil), a processing agent or a processing aid (a fatty acid such as stearic acid, a fatty acid metal salt such as a stearic acid metal salt, a fatty acid amide such as stearylamide, wax, paraffin, and the like), an antiaging agent (an antioxidant, a thermal antiaging agent, a bending crack inhibitor, an ozone deterioration inhibitor, and the like), a colorant, a tackifier agent, a lubricant, a coupling agent (a silane coupling agent and the like), a stabilizer (an ultraviolet ray absorber, a thermal stabilizer, and the like), a flame retardant agent, and an antistatic agent. The other components may be used alone or in combination of two or more thereof.

A total proportion of the other components is, for example, 1 part by mass to 100 parts by mass, preferably 2 parts by mass to 50 parts by mass, furthermore preferably 3 parts by mass to 20 parts by mass, and more preferably 4 parts by mass to 10 parts by mass with respect to 100 parts by mass of the polymer component.

(Properties of Crosslinked Product of Rubber Composition)

The rubber hardness Hs (type A) of a crosslinked product (cured product) of the rubber composition is, for example, 88 degrees to 96 degrees, preferably 90 degrees to 96 degrees, furthermore preferably 92 degrees to 96 degrees, and more preferably 93 degrees to 95 degrees from the viewpoint of preventing deformation of the belt and improving durability. If the rubber hardness is too low, the mechanical properties and the wear resistance of the belt may deteriorate, and if the rubber hardness is too high, the crack resistance may deteriorate and peeling may occur more easily.

In the present application, the rubber hardness of each of rubber layers indicates a value Hs (type A) measured using a type A durometer in accordance with a spring type durometer hardness test specified in JIS K 6253 (2012) (vulcanized rubber and thermoplastic rubber—hardness determining method-), and may be simply referred to as the rubber hardness. Specifically, the rubber hardness can be measured by a method described in Examples to be described later.

When the rubber composition contains the short fiber, the short fiber is usually oriented in a predetermined direction. For example, when a compression rubber layer of the power-transmission belt is formed by the rubber composition, in order to prevent compression deformation of the belt against pressing from a pulley, the short fiber is preferably embedded in the compression rubber layer while being oriented in a belt width direction.

When the rubber composition contains the short fiber, in the crosslinked product, an 8% bending stress in a short fiber orthogonal direction is preferably 6 MPa to 8 MPa in view of being capable of improving durability by preventing deformation of the belt. If the 8% bending stress in a short fiber orthogonal direction is too small, the lateral pressure resistance of the belt may be insufficient and the durability may deteriorate. Conversely, if the 8% bending stress in a short fiber orthogonal direction is too high, the bendability and the crack resistance may deteriorate and the durability may deteriorate.

When the rubber composition contains the short fiber, an 8% bending stress in a short fiber parallel direction is preferably 2 MPa to 3 MPa in a view of being capable of improving the bendability of the belt and the durability in the crosslinked product. If the 8% bending stress in a short fiber parallel direction is too small, the lateral pressure resistance of the belt may be insufficient and the durability may deteriorate. Conversely, if the 8% bending stress in a short fiber parallel direction is too high, the bendability and the crack resistance may deteriorate, and the durability may deteriorate.

In the present application, the 8% bending stress can be measured by setting a longitudinal direction of a pressure member in a direction perpendicular to an orientation direction (longitudinal direction) of the short fiber in the 8% bending stress in a short fiber orthogonal direction, and setting the longitudinal direction of the pressure member in the orientation direction (longitudinal direction) of the short fiber in the 8% bending stress in a short fiber parallel direction, and more specifically, can be measured by a method described in Examples to be described later.

In the present application, the "short fiber parallel direction" may be not only the longitudinal direction of the short fiber but also a direction within a range of ±5° in the longitudinal direction. The "short fiber orthogonal direction" may be not only a direction (perpendicular direction) perpendicular to the longitudinal direction of the short fiber, but also a direction within a range of 5° in the perpendicular direction.

[Power-Transmission Belt]

The type of the power-transmission belt (belt for power transmission) of the present invention is not particularly limited as long as the power-transmission belt is a belt that transmits power by coming into contact with a pulley, and may be a frictional power-transmission belt or a synchronous power-transmission belt.

Examples of the frictional power-transmission belt include a flat belt, a V-belt (a wrapped V-belt, a raw-edge V-belt, a raw-edge cogged V-belt obtained by forming cogs on an inner circumferential side of the raw-edge V-belt, a raw-edge double cogged V-belt obtained by forming cogs on both an inner circumferential side and an outer circumferential side of the raw-edge V-belt, and the like), a V-ribbed belt, and a resin block belt.

Examples of the synchronous power-transmission belt include a toothed belt and a double-side toothed belt.

These power-transmission belts may contain a crosslinked product of the rubber composition, but a belt main body (particularly the compression rubber layer and/or a tension rubber layer) is preferably formed by the crosslinked product of the rubber composition from the viewpoint that an effect of the present invention can be effectively exhibited.

Among the power-transmission belts, a power-transmission belt such as a cogged V-belt or a toothed belt, which is strictly required to increase the transmission power and make the layout compact, is preferable, and a cogged V-belt is particularly preferable.

The cogged V-belt of the present invention may include an adhesion rubber layer in contact with at least a part of a tension member extending in a longitudinal direction of the belt, a tension rubber layer formed on one surface of the adhesion rubber layer, and a compression rubber layer being formed on the other surface of the adhesion rubber layer, having a plurality of convex portions (cog portions) formed on an inner circumferential surface at predetermined intervals along the longitudinal direction of the belt, and frictionally engaging with a pulley on a side surface. Such a cogged V-belt includes a cogged V-belt in which the cog portions are formed only on the compression rubber layer, and a double cogged V-belt in which the same cog portions are formed on an outer circumferential surface of the tension rubber layer in addition to the compression rubber layer. The cogged V-belt is preferably a V-belt in which a side surface of a compression rubber layer is in contact with a pulley (particularly a variable speed belt used in a transmission in which a gear ratio is continuously changed during belt running). Examples of the cogged V-belt include a raw-edge cogged V-belt obtained by forming cogs on an inner circumferential side of a raw-edge belt, and a raw-edge double cogged V-belt obtained by forming cogs on both an inner circumferential side and an outer circumferential side of a raw-edge belt. Among them, a raw-edge cogged V-belt used for driving a continuously variable transmission (CVT) is particularly preferable.

Figure 2:
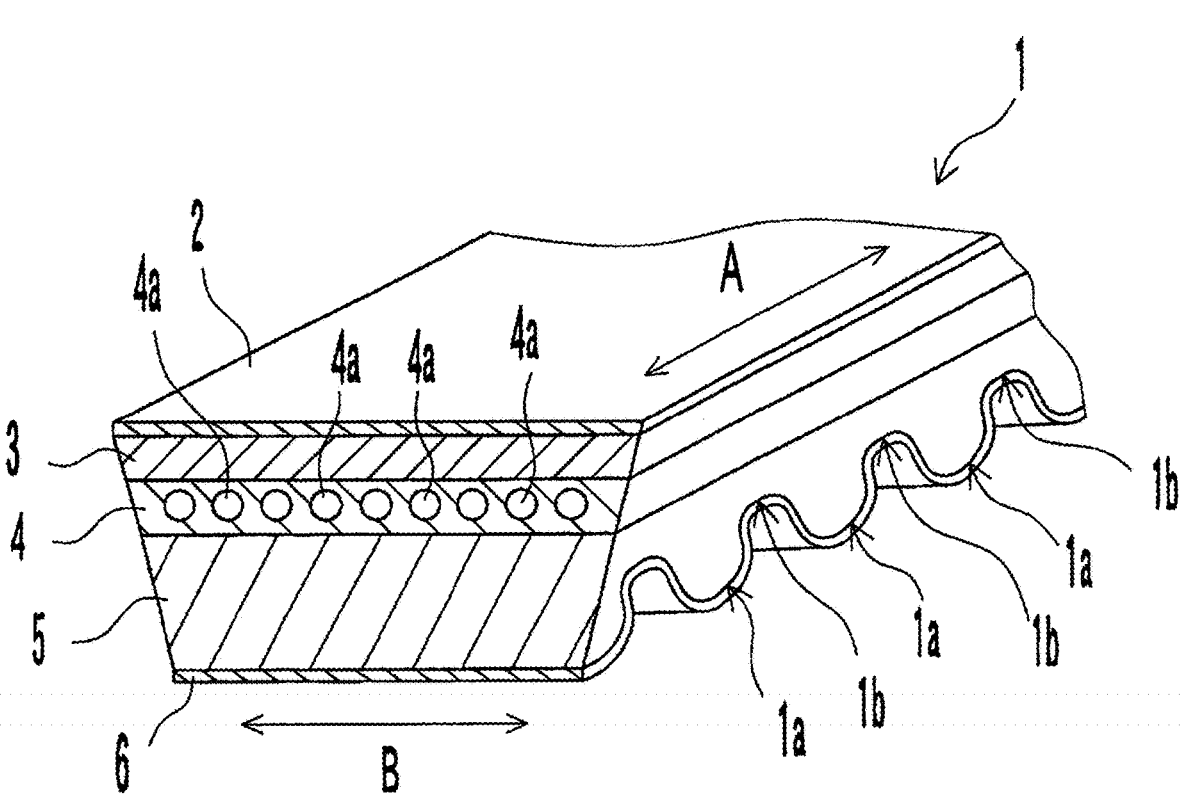
FIG. 2 is a schematic partial cross-sectional perspective view illustrating an example of a raw-edge cogged V-belt of the present invention.
Figure 3:
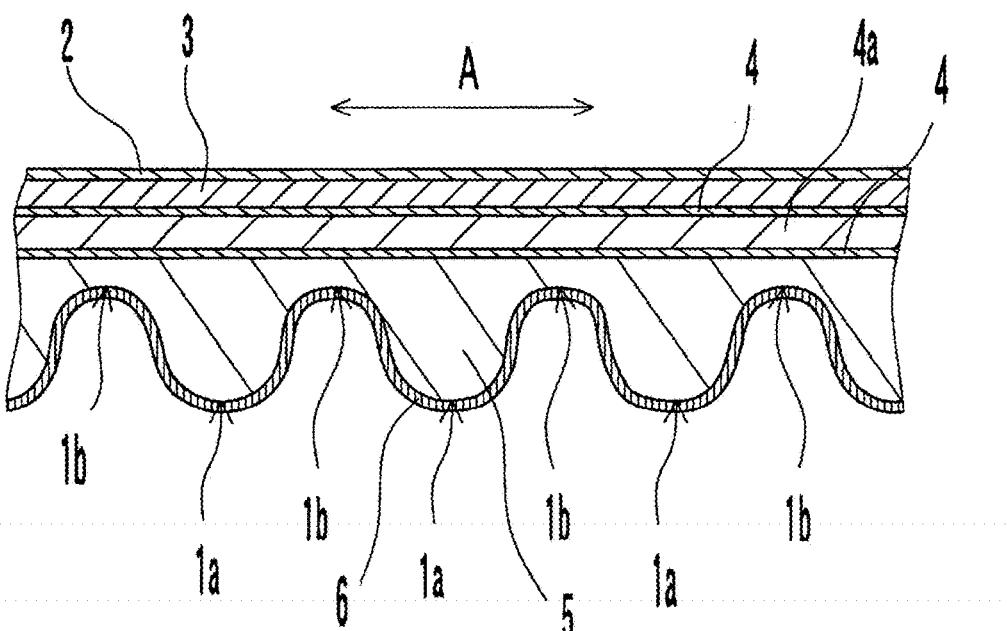
FIG. 3 is a schematic cross-sectional view of a raw-edge cogged V-belt in FIG. 2 cut in a longitudinal direction of the belt.

FIG. 2 is a schematic perspective view illustrating an example of the power-transmission belt (raw-edge cogged V-belt) of the present invention, and FIG. 3 is a schematic cross-sectional view of the power-transmission belt of FIG. 2 cut in a longitudinal direction of the belt.

In this example, a raw-edge cogged V-belt 1 has a plurality of cog portions 1a formed at predetermined intervals along the longitudinal direction (A direction in the drawing) of the belt on an inner circumferential surface of a belt main body, a cross-sectional shape in the longitudinal direction of each of the cog portions 1a is approximately semicircular shape (curved or wavy shape), and a cross-sectional shape in a direction perpendicular to the longitudinal direction (width direction or B direction in the drawing) is trapezoidal shape. That is, each of the cog portions (cog ridge portion or cog top portion) 1a protrudes in a substantially semicircular shape in a cross section in the A direction from a cog bottom portion (cog valley portion) 1b in a belt thickness direction. The raw-edge cogged V-belt 1 has a laminated structure, and a reinforcing fabric 2, a tension rubber layer 3, an adhesion rubber layer 4, a compression rubber layer 5, and a reinforcing fabric 6 are sequentially laminated from an outer circumferential side toward an inner circumferential side (side on which the cog portions 1a are formed) of the belt. The cross-sectional shape in the belt width direction is a trapezoidal shape in which a belt width decreases from the outer circumferential side toward the inner circumferential side of the belt. Furthermore, a core body 4a is embedded in the adhesion rubber layer 4, and the cog portions 1a are formed at the compression rubber layer 5 by a molding die with a cog.

A height of the cog portion and a pitch between the cog portions are the same as those of the commonly used cogged V-belt. In the compression rubber layer, the height of the cog portion is 50% to 95% (particularly 60% to 80%) with respect to a thickness of the entire compression rubber layer, and the pitch between the cog portions (distance between central portions of adjacent cog portions) is 50% to 250% (particularly 80% to 200%) with respect to the height of the cog portion. The same applies to a case where the cog portion is formed on the tension rubber layer.

In this example, the tension rubber layer 3 and the compression rubber layer 5 are formed by a crosslinked product of the rubber composition. Regarding the adhesion rubber layer, the core body, and the reinforcing fabric, a commonly used adhesion rubber layer, core body, and reinforcing fabric can be used, and for example, the following adhesion rubber layer, core body, and reinforcing fabric may be used.

(Adhesion Rubber Layer)

Similar to the crosslinked rubber composition of the compression rubber layer and the tension rubber layer, the rubber composition for forming the adhesion rubber layer may contain a polymer component, a crosslinking agent (a sulfur vulcanizing agent such as sulfur), a co-crosslinking agent or a crosslinking aid (a maleimide crosslinking agent such as N,N'-m-phenylene dimaleimide), a crosslinking accelerator (TMTD, CBS, MBTBS, and the like), a filler (carbon black, silica, and the like), a softening agent (oils such as a paraffinic oil), a processing agent or a processing aid, an antiaging agent, an adhesion improving agent [a resorcinol-formaldehyde co-condensate, an amino resin (condensates of nitrogen-containing cyclic compounds and formaldehyde such as melamine resins such as hexamethylolmelamine, hexaalkoxymethylmelamine (hexamethoxymethylmelamine, hexabutoxymethylmelamine, and the like), urea resins such as a methylolurea, and benzoguanamine resins such as a methylolbenzoguanamine resin), co-condensates thereof (resorcin-melamine-formaldehyde co-condensates and the like), and the like], a colorant, a tackifier, a plasticizer, a coupling agent, a stabilizer, a flame retardant, an antistatic agent, and the like. In the adhesion improving agent, the resorcinol-formaldehyde co-condensate and the amino resin may be an initial condensate (prepolymer) of resorcin and/or a nitrogen-containing cyclic compound such as melamine and formaldehyde.

In the rubber composition, a polymer of the same system or the same type as the polymer component of the rubber composition of the compression rubber layer and the tension rubber layer is usually used as the polymer component. Proportions of the crosslinking agent, the co-crosslinking agent or the crosslinking aid, the crosslinking accelerator, the softening agent, and the antiaging agent can be selected from the same ranges as in the rubber composition of the compression rubber layer and the tension rubber layer. In the rubber composition of the adhesion rubber layer, the total proportion of the filler is 10 parts by mass to 100 parts by mass, preferably 20 parts by mass to 80 parts by mass, and furthermore preferably 30 parts by mass to 50 parts by mass with respect to 100 parts by mass of the polymer component. The total proportion of the adhesion improving agent (resorcinol-formaldehyde co-condensate, hexamethoxymethylmelamine, and the like) is 0.1 parts by mass to 20 parts by mass, preferably 1 part by mass to 10 parts by mass, and more preferably 2 parts by mass to 8 parts by mass with respect to 100 parts by mass of the polymer component.

(Core Body)

The core body is not particularly limited, but tension members (twisted cords) arranged at a predetermined interval in the belt width direction can be usually used. The tension members are arranged to extend in the longitudinal direction of the belt, and are usually arranged to extend in parallel at a predetermined pitch in the longitudinal direction of the belt. It is sufficient that at least a part of the tension member is in contact with the adhesion rubber layer, and the tension member may be in any form of a form in which the tension member is embedded in the adhesion rubber layer, a form in which the cord is embedded between the adhesion rubber layer and the tension rubber layer (on a tension layer side), and a form in which the tension member is embedded between the adhesion rubber layer and the compression rubber layer (on a compression rubber layer side). Among these, the form in which the tension member is embedded in the adhesion rubber layer is preferable from the viewpoint of improving the durability.

Examples of the fiber constituting the tension member include the same fiber as the short fiber. Among the fibers, a synthetic fiber such as a polyester fiber (polyalkylene arylate fiber) having $C_{2-4}$ alkylene-allylate such as ethylene terephthalate and ethylene-2,6-naphthalate as a main structural unit and an aramid fiber, an inorganic fiber such as a carbon fiber, and the like are widely used from the viewpoint of high modulus, and the polyester fiber (a polyethylene terephthalate fiber, a polyethylene naphthalate fiber) and the aramid fiber are preferable. These fibers may be used in the form of a multifilament yarn including a plurality of filaments. The fineness of the multifilament yarn is, for example, 200 dtex to 5000 dtex (particularly 500 dtex to 2000 dtex). The multifilament yarn may include, for example, 100 filaments to 5000 filaments, preferably 500 filaments to 4000 filaments, and furthermore preferably 1000 filaments to 3000 filaments.

As the tension member, generally, a twisted cord including a multifilament yarn (for example, a piled cord, a single twisted cord or Lang twisted cord) can be used. The fineness of the tension member (twisted cord) is, for example, 3000 dtex to 30000 dtex, preferably 4000 dtex to 15000 dtex, and furthermore preferably 5000 dtex to 8000 dtex. The tension member (twisted cord) may include, for example, 1000 filaments to 15000 filaments, preferably 2000 filaments to 10000 filaments, and furthermore preferably 5000 filaments to 7000 filaments. The average wire diameter of the tension member (diameter of twisted cord) may be, for example, 0.5 mm to 3 mm, preferably 0.6 mm to 2 mm, and furthermore preferably 0.7 mm to 1.5 mm.

In order to improve adhesiveness to the polymer component, the tension member may be subjected to an adhesion treatment (or surface treatment) in the same manner as the short fibers of the compression rubber layer and the tension rubber layer. Similarly to the short fiber, the tension member is preferably subjected to the adhesion treatment with at least the RFL liquid.

(Reinforcing Fabric)

When a reinforcing fabric is used for the frictional power-transmission belt, the present invention is not limited to a form in which the reinforcing fabric is laminated on a surface of the compression rubber layer, and for example, may be a form in which the reinforcing fabric is laminated on a surface of the tension rubber layer (surface opposite to adhesion rubber layer), or a reinforcing layer is embedded in the compression rubber layer and/or the tension rubber layer (for example, the form described in JP2010-230146A). The reinforcing fabric can be formed by, for example, a fabric material (preferably woven fabric) such as woven fabric, wide-angle canvas fabric, knitted fabric, or non-woven fabric, and if necessary, the reinforcing fabric may be laminated on the surface of the compression rubber layer and/or the tension rubber layer after the adhesion treatment, for example, a treatment with the RFL liquid (immersion treatment or the like), friction in which an adhesion rubber is rubbed into the fabric material, or lamination of the adhesion rubber and the fabric material.

(Method for Producing Power-Transmission Belt)

A method for producing a power-transmission belt of the present invention is not particularly limited, and a commonly used method can be used. In the case of the raw-edge cogged V-belt, for example, a laminate including a reinforcing fabric (lower fabric) and a compression rubber layer sheet (uncrosslinked rubber sheet) may be disposed in a flat cogged mold in which tooth portions and groove portions are alternatively provided, in the state of the reinforcing fabric facing down, and press-pressurized at a temperature of about 60° C. to 100° C. (particularly 70° C. to 80° C.) to prepare a cog pad having cog portions embossed (which is not completely crosslinked and is in a semi-crosslinked state), and then both ends of the cog pad may be vertically cut from a top of a cog ridge portion. Furthermore, a cylindrical mold may be covered with an inner mother mold (mold formed of crosslinked rubber) having tooth portions and groove portions alternately arranged, the cog pad may be wound by engaging with the tooth portions and the groove portions to joint at the top of the cog ridge portion, a first adhesion rubber layer sheet (lower adhesion rubber: uncrosslinked rubber sheet) may be laminated on the wound cog pad, and then the tension member (twisted cord) for forming the core body may be spun spirally, and a second adhesion rubber layer sheet (upper adhesion rubber: the same as the adhesion rubber layer sheet), a tension rubber layer sheet (uncrosslinked rubber sheet), and a reinforcing fabric (upper fabric) may be sequentially wound thereon to produce a molded product. Then, after a crosslinking step of disposing the mold in a vulcanization can by covering the mold with a jacket (jacket formed of a crosslinked rubber), and performing crosslinking at a temperature of 120° C. to 200° C. (particularly 150° C. to 180° C.) to prepare a belt sleeve, a cutting step of cutting the belt sleeve into a V-shaped cross section using a cutter or the like to form a compression rubber layer by may be performed.

In the raw-edge cogged V-belt free from a reinforcing fabric, the laminate in which the compression rubber layer sheet and the first adhesion rubber layer sheet are press-pressurized in advance may be prepared.

Examples of a method for orienting the orientation direction of the short fiber in the belt width direction in the tension rubber layer sheet and the compression rubber layer sheet include a commonly used method, for example, a method in which rubber is passed through a pair of calendar rolls with a predetermined gap and rolled into a sheet shape, both side surfaces of the rolled sheet in which the short fiber is oriented in a rolling direction is cut in a direction parallel to the rolling direction, the rolled sheet is cut in a direction perpendicular to the rolling direction so as to have a belt molding width (length in the belt width direction), and the side surfaces cut in the direction parallel to the rolling direction are jointed. For example, the method described in JP2003-14054A can be used. The uncrosslinked sheet in which the short fiber is oriented by such a method is crosslinked by disposing the short fiber such that the orientation direction of the short fiber is the belt width direction in the above method.

EXAMPLES

Hereinafter, the present invention will be described in more detail based on Examples, but the present invention is not limited to these Examples. Details of the used materials are shown below.

[Used Materials]

(Polymer)

EPDM 1: "EP123" manufactured by JSR Corporation, ethylene content: 58 mass %, diene content: 4.5 mass %, Mooney viscosity: 19.5 ML (1+4) 125° C.

EPDM 2: "EP24" manufactured by JSR Corporation, ethylene content: 54 mass %, diene content: 4.5 mass %, Mooney viscosity: 42 ML (1+4) 125° C.

(Short Fiber)

Cotton short fiber: "cotton short fiber" manufactured by Hashimoto Co., Ltd., average fineness (cotton count): 8 counts, average fiber length: 6 mm PET short fiber: manufactured by Hirou Short Fiber Co., Ltd., average fiber diameter: 17 μm, average fiber length: 3 mm Nylon short fiber: "Leona" manufactured by Asahi Kasei Co., Ltd., average fiber diameter: 27 μm, average fiber length: 3 mm Para-aramid short fiber: "Twaron (registered trademark)" manufactured by Teijin Limited, average fiber diameter: 12 m, average fiber length: 3 mm (Filler)

Carbon black ISAF (hard carbon): "SHOBLACK N220" manufactured by Cabot Corporation Carbon black SRF (soft carbon): "SHOBLACK N762" manufactured by Cabot Corporation Carbon black FEF (soft carbon): "SHOBLACK N550" manufactured by Cabot Corporation Clay A (calcined clay): "PoleStar" manufactured by Imerys Performance Minerals, pH: 6.2

Clay B (kaolin clay): "Speswhite" manufactured by Imerys Performance Minerals, pH: 4.8

Clay C (catalpo (agalmatolite clay): "catalpo" manufactured by Eiwa Rising Co., Ltd., pH: 6.3

Clay D (kaolin clay): "China Clay" manufactured by Global Minechem Corporation, pH: 7.2

Silica: "Ultrasil VN3" manufactured by Evonik Degussa, BET specific surface area: 175 m²/g Calcium carbonate: "Super 1500" manufactured by Maruo Calcium Co., Ltd.

(Method for Measuring pH of Clay)

The pH of each of the clay A, clay B, clay C, and clay D was measured in accordance with a method for measuring pH of pigment (room-temperature extraction method) specified in JIS K 5101-17-2(2004) using a glass electrode.

(Other Components)

Paraffinic oil: "Diana Process Oil PW90" manufactured by Idemitsu Kosan Co., Ltd.

Antiaging agent DCD (4,4'-bis(α,α-dimethylbenzyl)diphenylamine): "Nocrac CD" manufactured by Ouchi Shinko Chemical Industrial Co., Ltd.

Antiaging agent ODPA (octyl diphenylamine): "Nonflex OD-3" manufactured by Seiko Chemical Co., Ltd.

Zinc Oxide: "Zinc oxide second grade" manufactured by Sakai Chemical Industry Co., Ltd.

Stearic acid: "Stearic acid TSUBAKI" manufactured by NOF Corporation

Crosslinking accelerator TMTD (tetramethylthiuram disulfide): "Noeceler TT" manufactured by Ouchi Shinko Chemical Industrial Co., Ltd.

Crosslinking accelerator CBS (N-cyclohexyl-2-benzothiazolylsulfenamide): "Noeceler CZ" manufactured by Ouchi Shinko Chemical Industrial Co., Ltd.

Crosslinking accelerator MBTS (di-2-benzothiazolyl disulfide): "Noeceler DM" manufactured by Ouchi Shinko Chemical Industrial Co., Ltd.

Co-crosslinking agent MPBM (N,N'-m-phenylene dimaleimide): "Vulnoc PM" manufactured by Ouchi Shinko Chemical Industrial Co., Ltd.

Sulfur: "MIDAS" manufactured by Miwon Chemicals Co., Ltd.

Organic peroxide: "Perbutyl P-40 MB" manufactured by NOF Corporation, active ingredient: 40 mass %

Resorcin-formalin copolymer: "Phenacolite Resin B-18-S" manufactured by INDSPEC Chemical Corporation Hexamethoxymethylmelamine: "POWERPLAST PP-1890S" manufactured by SINGH PLASTICISER & RESINS (Tension Member)

Tension member in which an adhesion treatment was applied to a plied cord having a total fineness of 6600 dtex (the number of filaments was 6000). The plied cord was obtained by combining three primary twisted yarns and performing a secondary twist with a twist coefficient of 3.0. Each of the primary twisted yarns was obtained by combining two 1100 dtex (the number of filaments is 1000) aramid fiber bundles and performing a primary twist with a twist coefficient of 3.0.

(Reinforcing Fabric)

Treated fabric in which a composition for an adhesion rubber layer having a composition shown in Table 2 was mixed into fabric (fabric weight: 280 g/m²) obtained by plain weaving 20 count cotton threads at a thread density of 75 threads/50 mm.

TABLE 2

| (for adhesion rubber layer) | |
| --- | --- |
| Composition | Part(s) by mass |
| EPDM 1 | 100 |
| Carbon black FEF | 30 |
| Silica | 15 |
| Paraffinic oil | 10 |
| Antiaging agent ODPA | 2 |
| Zinc oxide | 5 |
| Resorcin-formalin co-condensate | 2 |
| Hexamethoxymethylmelamine | 3 |
| Crosslinking accelerator TMTD | 1 |
| Crosslinking accelerator CBS | 0.5 |
| Crosslinking accelerator MBTS | 0.5 |
| Sulfur | 1 |
| Total | 170 |

Examples 1 to 9 and Comparative Examples 1 to 8

[Production of Raw-Edge Cogged V-Belt]

A laminate in which a reinforcing fabric, an uncrosslinked compression rubber layer sheet having a composition shown in Table 3, and an uncrosslinked first adhesion rubber layer sheet having the composition shown in Table 2 were laminated in this order was wound around an outer circumference of a cogged mold in which tooth portions and groove portions were alternately arranged, in a state in which the reinforcing fabric is on the mold side. After the outer circumference of the laminate was covered with a flexible jacket, the mold was disposed in a vulcanization can, and the laminate of the reinforcing fabric, the uncrosslinked compression rubber layer sheet, and the uncrosslinked adhesion rubber layer sheet was press-fitted into the cog portion of the mold by injecting steam into the periphery of the flexible jacket to perform pressurization and heating (about 75° C.). Thereafter, the mold was removed from the vulcanization can, and the flexible jacket was removed. Then, a tension member was spirally wound around the outer circumference of the uncrosslinked adhesion rubber layer sheet, and the laminate in which the uncrosslinked second adhesion rubber layer sheet having the composition shown in Table 2 and the uncrosslinked tension rubber layer sheet having the composition shown in Table 3 were laminated was wound around the outer circumference of the tension member in a state in which the uncrosslinked second adhesion rubber layer sheet was on the tension member side. After the outer circumference of the laminate was covered with the flexible jacket, the mold was disposed in the vulcanization can, and a belt sleeve was produced by injecting steam into the periphery of the flexible jacket and the inside of the mold, and applying pressure and heating (about 170° C.) for 40 minutes. The produced belt sleeve was cut into a V shape with a cutter to produce a raw-edge cogged V-belt having cogs on an inner circumferential surface of the belt (upper width: 19 mm, thickness (thickness at cog top portion): 9 mm, outer circumferential length: 740 mm).

TABLE 3

| | | | | | | | | | |
|---|---|---|---|---|---|---|---|---|---|
| (for compression rubber layer and tension rubber layer) | | | | | | | | | |
| | Example | | | | | | | | |
| | 1 | 2 | 3 | 4 | 5 | 6 | 7 | 8 | 9 |
| EPDM 1 | 100 | 100 | 100 | 100 | 100 | 100 | 100 | 100 | 100 |
| EPDM 2 | — | — | — | — | — | — | — | — | — |
| Cotton short fiber | 10 | 10 | 10 | 10 | 10 | 10 | 10 | 10 | 10 |
| PET short fiber | 20 | 20 | 20 | 20 | 20 | 20 | — | 20 | 20 |
| Nylon short fiber | — | — | — | — | — | — | 20 | — | — |
| Para-aramid short fiber | — | — | — | — | — | — | — | — | — |
| Carbon black ISAF | 75 | 75 | 60 | — | 65 | 75 | 75 | 75 | 75 |
| Carbon black SRF | — | — | — | 110 | — | — | — | — | — |
| Clay A | 20 | 40 | 55 | 55 | 20 | 40 | 40 | — | — |
| Clay B | — | — | — | — | — | — | — | — | — |
| Clay C | — | — | — | — | — | — | — | 40 | — |
| Clay D | — | — | — | — | — | — | — | — | 40 |
| Calcium carbonate | — | — | — | — | — | — | — | — | — |
| Paraffinic oil | 3 | 3 | 3 | 3 | 3 | 3 | 3 | 3 | 3 |
| Antiaging agent DCD | 0.5 | 0.5 | 0.5 | 0.5 | 0.5 | 0.5 | 0.5 | 0.5 | 0.5 |
| Zinc oxide | 5 | 5 | 5 | 5 | 5 | 5 | 5 | 5 | 5 |
| Stearic acid | 1 | 1 | 1 | 1 | 1 | 1 | 1 | 1 | 1 |
| Crosslinking accelerator TMTD | 0.5 | 0.5 | 0.5 | 0.5 | 0.5 | — | 0.5 | 0.5 | 0.5 |
| Crosslinking accelerator CBS | 1 | 1 | 1 | 1 | 1 | — | 1 | 1 | 1 |
| Crosslinking accelerator MBTS | 1 | 1 | 1 | 1 | 1 | — | 1 | 1 | 1 |
| Co-crosslinking agent MPBM | 1 | 1 | 1 | 1 | 1 | 3 | 1 | 1 | 1 |
| Sulfur | 2 | 2 | 2 | 2 | 2 | — | 2 | 2 | 2 |
| Organic peroxide | — | — | — | — | — | 5 | — | — | — |
| Total | 240 | 260 | 260 | 310 | 230 | 262.5 | 260 | 260 | 260 |
| Total amount of carbon black and clay | 95 | 115 | 115 | 165 | 85 | 115 | 115 | 115 | 115 |

TABLE 3-continued

| (for compression rubber layer and tension rubber layer) | | | | | | | | | |
|---|---|---|---|---|---|---|---|---|---|
| Clay/carbon black (mass ratio) | 0.27 | 0.53 | 0.92 | 0.5 | 0.31 | 0.53 | 0.53 | 0.53 | 0.53 |

| | Comparative Example | | | | | | | |
|---|---|---|---|---|---|---|---|---|
| | 1 | 2 | 3 | 4 | 5 | 6 | 7 | 8 |
| EPDM 1 | 100 | 100 | 100 | — | 100 | — | 100 | 50 |
| EPDM 2 | — | — | — | 100 | — | 100 | — | 50 |
| Cotton short fiber | 10 | 10 | 10 | 10 | 10 | 10 | 10 | 10 |
| PET short fiber | 20 | 20 | 20 | 20 | 20 | — | 20 | 20 |
| Nylon short fiber | — | — | — | — | — | — | — | — |
| Para-aramid short fiber | — | — | — | — | — | 20 | — | — |
| Carbon black ISAF | 50 | — | 75 | 75 | 75 | 65 | 60 | 75 |
| Carbon black SRF | — | 135 | — | — | — | — | — | — |
| Clay A | 70 | 55 | — | 40 | — | — | 15 | 40 |
| Clay B | — | — | — | — | 40 | — | — | — |
| Clay C | — | — | — | — | — | — | — | — |
| Clay D | — | — | — | — | — | — | — | — |
| Calcium carbonate | — | — | 40 | — | — | — | — | — |
| Paraffinic oil | 3 | 3 | 3 | 3 | 3 | 10 | 3 | 3 |
| Antiaging agent DCD | 0.5 | 0.5 | 0.5 | 0.5 | 0.5 | 0.5 | 0.5 | 0.5 |
| Zinc oxide | 5 | 5 | 5 | 5 | 5 | 5 | 5 | 5 |
| Stearic acid | 1 | 1 | 1 | 1 | 1 | 1 | 1 | 1 |
| Crosslinking accelerator TMTD | 0.5 | 0.5 | 0.5 | 0.5 | 0.5 | 0.5 | 0.5 | 0.5 |
| Crosslinking accelerator CBS | 1 | 1 | 1 | 1 | 1 | 1 | 1 | 1 |
| Crosslinking accelerator MBTS | 1 | 1 | 1 | 1 | 1 | 1 | 1 | 1 |
| Co-crosslinking agent MPBM | 1 | 1 | 1 | 1 | 1 | 1 | 1 | 1 |
| Sulfur | 2 | 2 | 2 | 2 | 2 | 2 | 2 | 2 |
| Organic peroxide | — | — | — | — | — | — | — | — |
| Total | 265 | 335 | 260 | 260 | 260 | 217 | 220 | 260 |
| Total amount of carbon black and clay | 120 | 190 | 75 | 115 | 115 | 65 | 75 | 115 |
| Clay/carbon black (mass ratio) | 1.4 | 0.41 | 0 | 0.53 | 0.53 | 0 | 0.25 | 0.53 |

[Scorch Time]

Similar to the Mooney viscosity, regarding the scorch time, a torque required to rotate a rotor is measured, but the scorch time is used as an index to indicate ease of a crosslinking progress of a rubber composition by measuring a time for the Mooney viscosity to increase by 5M (5 points) from a lowest value. The measurement of the scorch time was in accordance with a Mooney scorch test of JIS K 6300-1 (2013), an L-shaped rotor was used as the rotor, and at a test temperature of 125° C. and a preheating time of 1 minute, a test time when the Mooney viscosity increased by 5M from the lowest value was measured. The scorch time of 5 minutes or more was evaluated as an acceptable result, that is, "good", and the scorch time of fewer than 5 minutes was evaluated as an unacceptable result, that is, "bad". Results are shown in Table 4.

[Rolling Property]

Workability when a rubber composition having the composition shown in Table 3 was rolled into a sheet having a thickness of 2 mm using an open roll was evaluated. A case where the rolling could be performed without any problem was evaluated as "good", a case where a hole was generated in the sheet was evaluated as "slightly bad", and a case where a large number of holes were generated in the sheet, causing the sheet to break, was evaluated as "bad". Results are shown in Table 4.

[Rubber Hardness Hs of Crosslinked Rubber]

An uncrosslinked rubber sheet having the compositions shown in Table 3 was press-crosslinked at a temperature of 170° C. and a pressure of 2 MPa for 30 minutes to produce a crosslinked rubber sheet (100 mm×100 mm×2 mm in thickness). A laminate obtained by laminating three crosslinked rubber sheets was used as a sample, and the rubber hardness Hs (type A) of the crosslinked rubber sheet was measured using a type A durometer in accordance with a spring type durometer hardness test specified in JIS K 6253 (2012) (vulcanized rubber and thermoplastic rubber—hardness determining method-). The rubber hardness of 88 degrees to 96 degrees was regarded as an acceptable result. Results are shown in Table 4.

[Tensile Strength]

A crosslinked rubber sheet produced for measuring the rubber hardness Hs of the crosslinked rubber was used as a sample, a test piece punched into a dumbbell shape (No. 5 shape) was produced in accordance with JIS K 6251 (2017). A dumbbell-shaped test piece was collected such that an arrangement direction (grain direction) of the short fiber was a tensile direction. A value (tensile strength T) obtained by dividing, by an initial cross-sectional area of the test piece, a maximum tensile force recorded when both ends of the test piece were gripped by a chuck (grip) and the test piece was pulled at a speed of 500 mm/min until the test piece was cut was defined as a tensile strength. Results are shown in Table 4.

[8% Bending Stress (Short Fiber Orthogonal Direction)]

Figure 4:
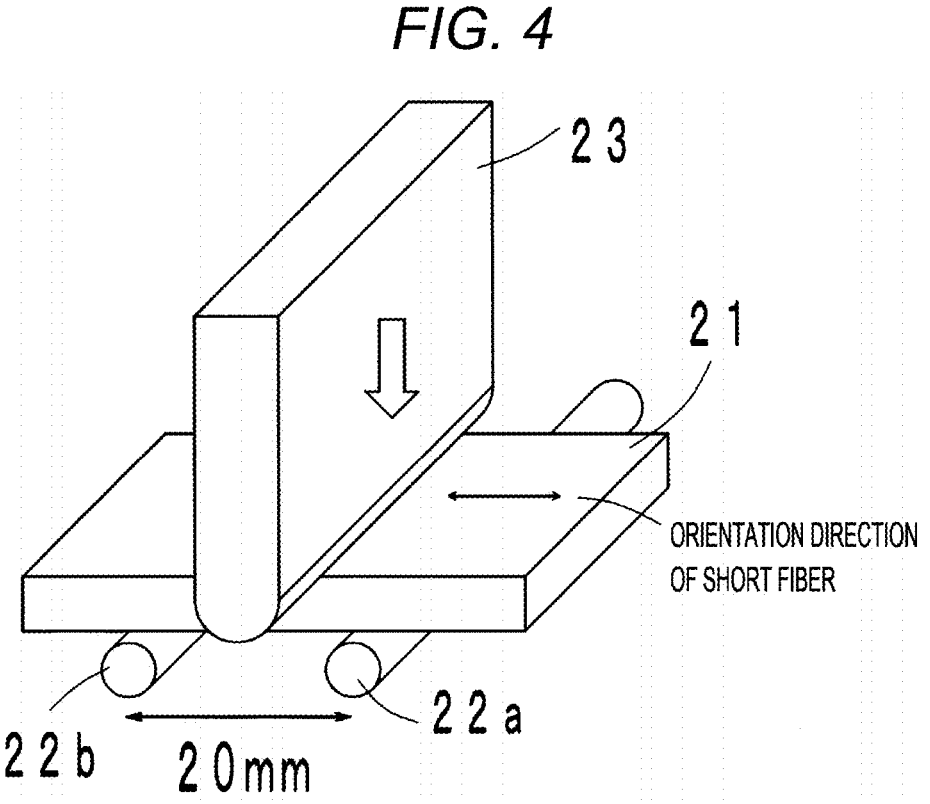
FIG. 4 is a schematic perspective view for illustrating a method for measuring an 8% bending stress (in a short fiber orthogonal direction) of a crosslinked rubber molded product obtained in Examples.

An uncrosslinked rubber composition having the composition shown in Table 3 was press-crosslinked at a temperature of 170° C., a pressure of 2 MPa, and a time of 30 minutes to produce a crosslinked rubber molded product (60 mm×25 mm×6.5 mm in thickness). The short fiber was oriented parallel to a longitudinal direction of the crosslinked rubber molded product. As illustrated in FIG. 4, a crosslinked rubber molded product 21 was placed and supported on a pair of rotatable rolls (diameter of 6 mm) 22a and 22b with an interval of 20 mm, and a metal pressure member 23 was placed on a central portion of an upper surface of the crosslinked rubber molded product in a width direction (direction orthogonal to the orientation direction of the short fiber). A tip of the pressure member 23 has a semi-circular shape having a diameter of 10 mm, and the crosslinked rubber molded product 21 can be smoothly pressed by the tip. During pressing, a friction force acts between a lower surface of the crosslinked rubber molded product 21 and the rolls 22a and 22b with compression deformation of the crosslinked rubber molded product 21, but an influence due to the friction is minimized by setting the rolls 22a and 22b rotatable. A state in which the tip of the pressure member 23 came into contact with but did not press the upper surface of the crosslinked rubber molded product 21 was defined as an initial position, and a stress when the pressure member 23 pressed downward the upper surface of the crosslinked rubber molded product 21 at a rate of 100 mm/min from the state and a bending strain reached 8% was measured as a bending stress. A measurement temperature was assumed to be a belt temperature during running and was set to 120° C. When the 8% bending stress in the short fiber orthogonal direction is large, it can be determined that a resistance to the buckling deformation referred to as dishing during belt running is high, and it can be said that the measured result in a range of 6 MPa to 8 MPa is good. Results are shown in Table 4.

[8% Bending Stress (Short Fiber Parallel Direction)]

Figure 5:
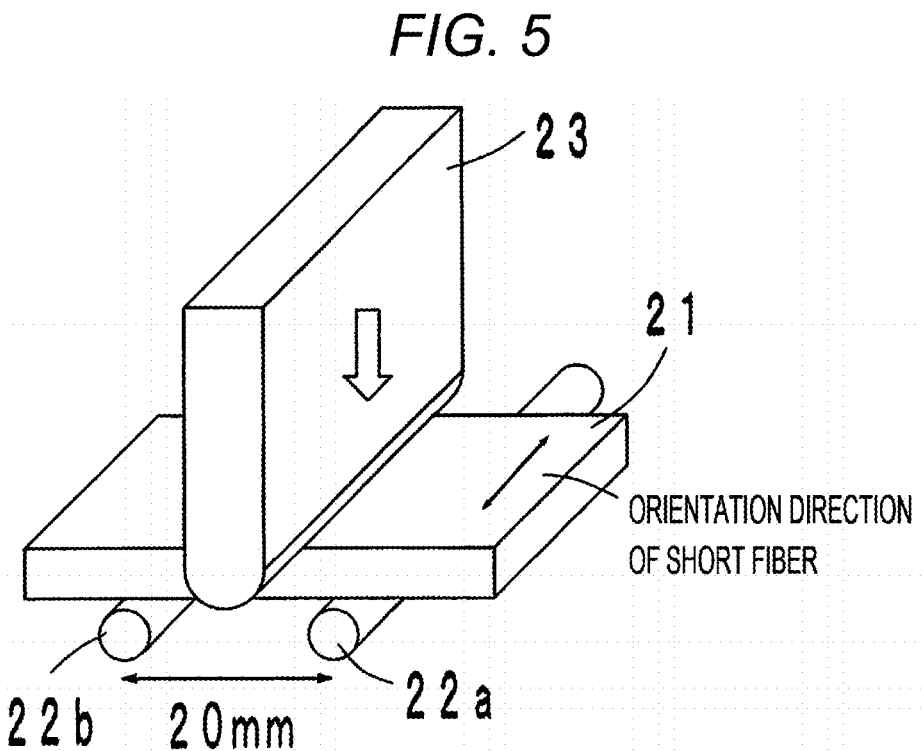
FIG. 5 is a schematic perspective view for illustrating a method for measuring an 8% bending stress (in a short fiber parallel direction) of a crosslinked rubber molded product obtained in Examples.

In the above method for measuring the 8% bending stress in a short fiber orthogonal direction, as illustrated in FIG. 5, measurement was performed in the same manner except that the short fiber was oriented orthogonal to the longitudinal direction of the rubber molded product when producing the crosslinked rubber molded product. That is, the orientation directions of the metal pressure member 23 and the short fiber were parallel to each other. When the 8% bending stress in a short fiber parallel direction is small, bendability of the belt can be determined to be good, and it can be said that the measured result in a range of 2 MPa to 3 MPa is good. Results are shown in Table 4.

[Durability Running Test]

Figure 6:
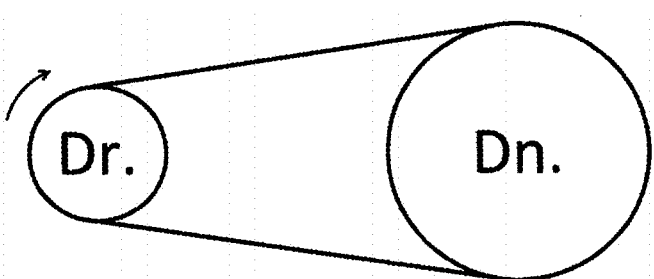
FIG. 6 is a schematic view illustrating a layout of a durability running test of a raw-edge cogged V-belt obtained in Examples.

As illustrated in FIG. 6, a durability running test was performed using a biaxial running test machine including a drive (Dr.) pulley having a diameter of 58 mm and a driven (Dn.) pulley having a diameter of 120 mm. The raw-edge cogged V-belt was wound around the two pulleys, and the belt ran for 75 hours at an ambient temperature of 60° C., an axial load of 500 N, a rotation speed of the driving pulley of 6000 rpm, and a load of the driven pulley of 7 N m. The side surface of the belt after running was visually observed, the presence or absence of peeling between the adhesion rubber layer and the tension member was examined, and if peeling occurred, the length was measured. An upper width of the belt before and after running was measured, and if an amount of change in the upper width (wear loss) was less than 0.3 mm, the wear resistance was determined to be good. Results are shown in Table 4.

[Reverse Bending Running Test]

Figure 7:
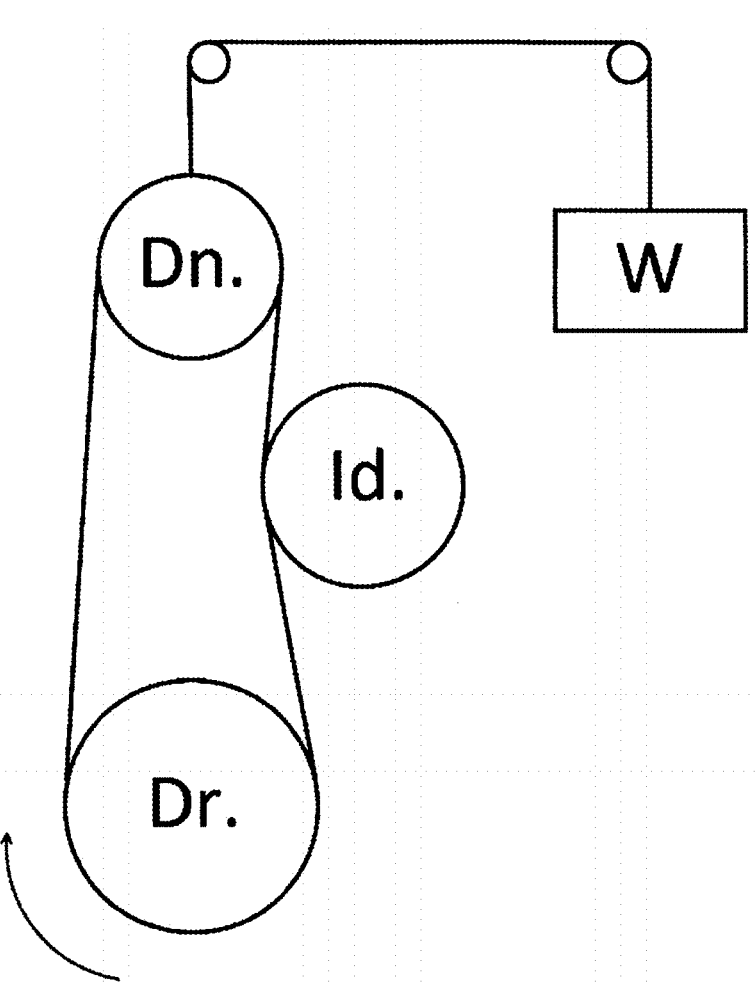
FIG. 7 is a schematic view illustrating a layout of a reverse bending running test of a raw-edge cogged V-belt obtained in Examples.

As illustrated in FIG. 7, a reverse bending running test was performed using a three-axis running testing machine including a drive (Dr.) pulley having a diameter of 115 mm, a driven (Dn.) pulley having a diameter of 95 mm, and a rear idler (Id.) pulley having a diameter of 90 mm. The raw-edge cogged V-belt was wound around each pulley, and a weight (W) of 40 kgf suspended via two rolls acted on the driven pulley to tension the belt, and a contact angle at the rear idler pulley (central angle with respect to a circular arc where the belt and the pulley are in contact) was adjusted to 15°. A rotation speed of the driving pulley was 3,600 rpm, and the driven pulley and the rear idler pulley ran at an ambient temperature of 110° C. for 60 hours with no load. The side surface of the belt (cog valley portion) after running was visually observed to examine the presence or absence of cracks. Results are shown in Table 4.

TABLE 4

| | Example | | | | | | | | | Comparative Example | | | | | | | |
|---|---|---|---|---|---|---|---|---|---|---|---|---|---|---|---|---|---|
| | 1 | 2 | 3 | 4 | 5 | 6 | 7 | 8 | 9 | 1 | 2 | 3 | 4 | 5 | 6 | 7 | 8 |
| Scorch time (min) | 10 | 10 | 9 | 9 | 11 | 13 | 10 | 10 | 11 | 11 | 7 | 9 | 10 | 4 | 11 | 11 | 9 |
| Scorch resistance | Good | Good | Good | Good | Good | Good | Good | Good | Good | Good | Good | Good | Good | Bad | Good | Good | Good |
| Rolling property | Good | Good | Good | Good | Good | Good | Good | Good | Good | Good | Slightly Bad | Good | Bad | Bad | Slightly Bad | Good | Bad |
| Rubber hardness Hs | 94 | 94 | 92 | 93 | 88 | 93 | 93 | 93 | 94 | 86 | 94 | 91 | — | — | 91 | 87 | — |
| Tensile strength (MPa) | 10.1 | 10.2 | 9.3 | 9.2 | 9.9 | 8.3 | 9.7 | 9.5 | 10.1 | 7.5 | 8.8 | 6.5 | — | — | 9.5 | 9.3 | — |
| 8% bending stress (short fiber orthogonal direction) | 7 | 7.1 | 6.8 | 6.9 | 6.6 | 7.2 | 6.6 | 6.9 | 7.1 | 6.3 | 7.3 | 6.7 | — | — | 6.3 | 6.2 | — |
| 8% bending stress (short fiber parallel direction) | 2.4 | 2.4 | 2.3 | 2.8 | 2.2 | 2.6 | 2.4 | 2.3 | 2.3 | 2 | 3.2 | 2.1 | — | — | 2.4 | 2.0 | — |
| Peeling | None | None | None | None | None | None | None | None | — | 1 mm | None | None | — | — | 1 mm | 1 mm | — |
| Amount of change in upper width (mm) | 0.15 | 0.10 | 0.20 | 0.15 | 0.25 | 0.15 | 0.25 | 0.10 | — | 0.35 | 0.20 | 0.30 | — | — | 0.20 | 0.30 | — |
| Crack | None | None | None | None | None | None | None | None | — | None | Present | None | — | — | None | None | — |

As is clear from the results shown in Table 4, Comparative Examples had problems in any one of the scorch resistance and the rolling property of the rubber composition, and the durability of the belt, whereas Examples 1 to 9 had a good scorch resistance and rolling property of the rubber composition, and Examples 1 to 8 also had an excellent durability of the belt.

Specifically, in Comparative Example 4 in which EPDM having a high Mooney viscosity was used, a sheet breakage occurred during rolling, and rolling into a sheet shape was impossible. In Comparative Example 8 in which the Mooney viscosity was adjusted to 31 by mixing the EPDM 1 and the EPDM 2, rolling into a sheet shape was impossible because the viscosity was high. Similarly, in Comparative Example 5 in which kaolin clay having a low pH was used as clay, rolling into a sheet shape was impossible. In Comparative Example 5, the scorch time was also short, and there is a possibility that rubber burning occurred.

In Comparative Example 3 in which calcium carbonate was used instead of the clay, the wear resistance of the belt deteriorated because the reinforcing property deteriorated. In Comparative Example 1 in which the ratio of the clay to the carbon black was high, the wear resistance deteriorated and peeling of 1 mm in length occurred between the adhesion rubber layer and the tension member probably due to deterioration in the hardness of the rubber. In Comparative Example 2 in which the total amount of the carbon black and the clay was large, the 8% bending stress in a short fiber parallel direction was high, cracks occurred, and the rolling property was low. In Comparative Example 7 in which the total amount of the carbon black and the clay was small, the 8% bending stress in a short fiber orthogonal direction was low, the wear resistance was low, and peeling of 1 mm in length occurred between the adhesion rubber layer and the tension member. The blending of Comparative Example 6 was a typical blending for a raw-edge cogged V-belt in which an aramid short fiber was blended, and a hole occurred in the sheet, resulting in a poor rolling property, and peeling of 1 mm in length also occurred between the adhesion rubber layer and the tension member.

Examples 1 to 3 are examples in which the ratio of the clay to the carbon black was changed, and Example 2 was the most excellent in the wear resistance. Examples 4 and 5 are examples in which the total amount of the carbon black and the clay was increased or decreased. In Example 5 in which the total amount of the carbon black and the clay was small, the wear resistance was slightly decreased, but was superior to most of Comparative Examples. In Example 4, soft carbon was used as the carbon black, but the results were comparable to those of other Examples. However, since the blending amount of the carbon black was large, there was a disadvantage in terms of cost, and it can be said that hard carbon is preferably used as the carbon black. In Example 6 in which an organic peroxide was used as a crosslinking agent and Example 7 in which nylon was used as the short fiber, good results were obtained. In Example 8, agalmatolite clay was used as the clay, and the physical properties of the rubber were slightly low, but the evaluation for the belt was good. In Example 9, a clay having a high pH was used as the clay, and an evaluation for the belt was not performed, but the physical properties of the rubber were equivalent to those in Example 2. In the present invention, it is possible to enhance a durability of a belt even if an inexpensive short fiber such as cotton, PET, and nylon is used instead of an expensive short fiber which is highly rigid and represented by aramid, and not only is there an advantage in terms of cost, but a flexibility of designing a fiber material is also improved.

INDUSTRIAL APPLICABILITY

The power-transmission belt of the present invention can be used for, for example, a frictional power-transmission belt such as a flat belt, a V-belt (a wrapped V-belt, a raw-edge V-belt, a raw-edge cogged V-belt, a raw-edge double cogged V-belt, and the like), a V-ribbed belt, and a resin block belt; and a synchronous power-transmission belt such as a toothed belt and a double-side toothed belt. Among them, the present invention can be preferably applied to a raw-edge V-belt, a raw-edge cogged V-belt having a cog portion, and the like, and can be particularly preferably used for a V-belt (variable speed belt) used in a transmission (continuously variable transmission) in which a gear ratio is continuously changed during belt running, for example, a raw-edge cogged V-belt or a raw-edge double cogged V-belt used for a continuously variable transmission of a motorcycle, an all terrain vehicle (ATV), a snowmobile, or the like.

Although the present invention has been described in detail with reference to specific embodiments, it is apparent to those skilled in the art that various changes and modifications can be made without departing from the spirit and scope of the present invention.

The present application is based on Japanese Patent Application No. 2022-007213 filed on Jan. 20, 2022 and Japanese Patent Application No. 2022-212385 filed on Dec. 28, 2022, the contents thereof are incorporated herein by reference.

REFERENCE SIGNS LIST

1: raw-edge cogged V-belt
2, 6: reinforcing fabric
3: tension rubber layer
4: adhesion rubber layer
4*a*: core body
5: compression rubber layer

The invention claimed is:

1. A rubber composition for a power-transmission belt, the composition comprising:

a polymer component comprising an ethylene-α-olefin elastomer;

carbon black;

clay; and a short fiber, wherein the ethylene-α-olefin elastomer has a Mooney viscosity at 125° C. of 25 ML (1+4) 125° C. or less, the clay has a pH of 5.5 or higher, a total amount of the carbon black and the clay is 80 parts by mass to 180 parts by mass with respect to 100 parts by mass of the polymer component, a mass ratio of the carbon black to the clay is clay/carbon black=0.2/1 to 1.2/1, a proportion of the short fiber is 5 parts by mass to 100 parts by mass with respect to 100 parts by mass of the polymer component, a crosslinked product of the rubber composition has an 8% bending stress in a short fiber orthogonal direction of 6 MPa to 8 MPa, and the crosslinked product of the rubber composition has an 8% bending stress in a short fiber parallel direction of 2 MPa to 3 MPa.

2. The rubber composition according to claim 1, wherein the crosslinked product of the rubber composition has a rubber hardness Hs (type A) of 88 degrees to 96 degrees.

3. The rubber composition according to claim 1, wherein the short fiber is free from an aramid short fiber.

4. The rubber composition according to claim 1, wherein the clay comprises a calcined clay.

5. The rubber composition according to claim 1, wherein the carbon black comprises a hard carbon black.

6. A power-transmission belt, comprising:

the crosslinked product of the rubber composition according to claim 1.

7. The power-transmission belt according to claim 6, being a raw-edge cogged V-belt.

8. The power-transmission belt according to claim 7, being a variable speed belt.

* * * * *